(12) United States Patent
Sindewald et al.

(10) Patent No.: US 12,416,437 B2
(45) Date of Patent: Sep. 16, 2025

(54) AIR CYCLE MACHINE FAILURE ALERT SYSTEM

(71) Applicant: UNITED AIRLINES, INC., Chicago, IL (US)

(72) Inventors: Justin Sindewald, Chicago, IL (US); Shuang Ling, Chicago, IL (US)

(73) Assignee: UNITED AIRLINES, INC., Chicago, IL (US)

( * ) Notice: Subject to any disclaimer, the term of this patent is extended or adjusted under 35 U.S.C. 154(b) by 183 days.

(21) Appl. No.: 18/180,678

(22) Filed: Mar. 8, 2023

(65) Prior Publication Data
US 2024/0302087 A1  Sep. 12, 2024

(51) Int. Cl.
| | |
|---|---|
| *F25B 49/02* | (2006.01) |
| *F25B 9/00* | (2006.01) |
| *G06N 3/0464* | (2023.01) |
| *G06N 3/09* | (2023.01) |
| *G06N 3/10* | (2006.01) |

(52) U.S. Cl.
CPC .............. *F25B 49/02* (2013.01); *F25B 9/004* (2013.01); *G06N 3/0464* (2023.01); *G06N 3/09* (2023.01); *G06N 3/105* (2013.01); *F25B 2500/06* (2013.01); *F25B 2700/13* (2013.01); *F25B 2700/2103* (2013.01)

(58) Field of Classification Search
CPC ...... F25B 49/02; F25B 9/004; F25B 2500/06; F25B 2500/19; F25B 2700/13; F25B 2700/2013; F25B 2700/171; F25B 2700/2115
See application file for complete search history.

(56) References Cited

U.S. PATENT DOCUMENTS

| | | | |
|---|---|---|---|
| 10,220,955 B2 | 3/2019 | Gregory et al. | |
| 2015/0166187 A1* | 6/2015 | Durbin | B64D 13/08 62/402 |
| 2017/0060125 A1 | 3/2017 | Beaven et al. | |
| 2020/0010203 A1* | 1/2020 | Ho | F02C 6/08 |
| 2022/0161931 A1* | 5/2022 | Kim | G05B 23/0232 |
| 2023/0281524 A1* | 9/2023 | Bondalapati | F02C 9/00 701/100 |

\* cited by examiner

*Primary Examiner* — Marc E Norman
(74) *Attorney, Agent, or Firm* — MARSHALL, GERSTEIN & BORUN LLP

(57) ABSTRACT

Disclosed herein is a method for failure prediction in an Air Cycle Machine (ACM). The method includes calculating a change in energy of an ACM airflow passing from an inlet of the ACM compressor to an outlet of the ACM compressor. The method may also include calculating a kinetic energy of the ACM compressor based on calculating the work of the ACM compressor on the ACM airflow as the ACM airflow passes through the ACM compressor, calculating the work of the ACM compressor based on the inlet temperature of the ACM airflow at the inlet of the ACM compressor, compressor pressure ratio of the ACM compressor, and a fluid property of the ACM airflow at the inlet of the ACM compressor. Additionally, the method can include calculating an ACM compressor efficiency as a ratio of the change in energy of the ACM airflow across the ACM compressor to the kinetic energy of the compressor. The method may further include predicting a failure state of the ACM compressor.

10 Claims, 15 Drawing Sheets

AIR CYCLE MACHINE FAILURE ALERT SYSTEM

FIELD

The present disclosure generally related to aircraft air conditioning and pressurization systems, and more particularly to, an air cycle machine failure alert system.

BACKGROUND

Many commercial aircraft cruise at altitudes between six and seven miles above sea level. Air pressure and oxygen content in the air at such altitudes is insufficient for humans to remain conscious. As a result, commercial aircraft are equipped with systems for pressurizing the aircraft cabin and/or fuselage. Such systems, in addition to providing adequate air pressure and oxygen, may also be configured to provide a comfortable flight experience. For example, such air pressurization systems can also assist in controlling the temperature in an aircraft fuselage during flight.

The systems designed to pressurize aircraft can vary by aircraft manufacturer or airplane type. These systems may include various compressors, sensors, heat exchangers, valves, and other components. Failure in such systems can result in inadequate air pressure and require the aircraft to land. In some larger aircraft, an aircraft can include several such systems for maintaining and controlling air pressure in an aircraft cabin. As a result, one system can be operated while the other is shut down until maintenance of the system can be completed.

SUMMARY

Disclosed herein is a method for failure prediction in an Air Cycle Machine (ACM). The method includes calculating a change in energy of an ACM airflow passing from an inlet of an ACM compressor to an outlet of the ACM compressor. Calculating the change in energy of the ACM airflow passing from the inlet to the outlet includes calculating an energy transfer across a heat exchanger between a ram airflow and the ACM airflow from a measured first temperature of the ram airflow, a calculated second temperature of the ram airflow, a calculated mass flowrate of the ram airflow, and a mass flowrate of the ACM airflow; calculating an inlet energy of the ACM airflow at the inlet of the ACM compressor from the mass flow rate of the ACM airflow and an inlet temperature of the ACM airflow at the inlet of the ACM compressor calculated based on the energy transfer calculation between the ACM airflow and the ram airflow; calculating an outlet energy of the ACM airflow based on the mass flow rate of the ACM airflow and an outlet temperature of the ACM airflow, the outlet temperature measured by a temperature sensor disposed at the outlet of the ACM compressor; and subtracting the inlet energy of the ACM airflow from the outlet energy of the ACM airflow. The method may further include calculating a kinetic energy of the ACM compressor based on calculating the work of the ACM compressor on the ACM airflow as the ACM airflow passes through the ACM compressor, calculating the work of the ACM compressor based on the inlet temperature of the ACM airflow at the inlet of the ACM compressor, compressor pressure ratio of the ACM compressor, and a fluid property of the ACM airflow at the inlet of the ACM compressor. Additionally, the method may include calculating an ACM compressor efficiency as a ratio of the change in energy of the ACM airflow across the ACM compressor to the kinetic energy of the ACM compressor. As a result, the method can include predicting a failure state of the ACM based on a comparison of the ACM compressor efficiency to a failure prediction model.

In some variations, the method includes flagging the ACM for maintenance. In such examples, flagging the ACM for maintenance includes initiating a maintenance action. For example, initiating a maintenance action can include performing a breakaway torque check of the ACM.

In other variations, energy transfer across the heat exchanger between the ram airflow and the ACM airflow includes disposing ducting of the ACM airflow in the ram airflow. In some examples, the failure prediction model for failure of the ACM is an ACM efficiency rising above 125 percent (%). Additionally or alternatively, the failure prediction model for failure of the ACM is an ACM efficiency below 25 percent (%).

Also disclosed herein is a method of predicting a failure state of an Air Cycle Machine (ACM) via sensor measurements outside an ACM system. The method may include calculating an inlet temperature of an ACM airflow at an inlet of an ACM compressor based on calculating an energy transfer between the ACM airflow and a ram airflow, calculating the energy transfer including calculating a ram airflow mass flow rate, sensing an inlet ram airflow temperature, and sensing an outlet ram airflow temperature. The method may further include calculating a kinetic energy of the ACM compressor based on the inlet temperature of the ACM airflow at the ACM compressor inlet, a compressor pressure ratio of the ACM compressor, and a fluid density of the ACM airflow at the ACM compressor inlet. The method may also include calculating a change of energy of the ACM airflow from the inlet of the ACM compressor to an outlet of the ACM compressor based on the inlet temperature of the ACM airflow and sensing an outlet temperature of the ACM airflow at the ACM compressor outlet. In some examples, the method includes calculating a compressor efficiency as a ratio of the change of energy of the ACM airflow and the kinetic energy of the compressor. As a result, the method may include predicting a failure state of the ACM based on comparing the compressor efficiency to a failure prediction model.

In some variations, the method may further include controlling the ACM in response to the prediction of the failure state by initiating a maintenance action. For example, the method may include initiating a maintenance action includes performing a breakaway torque check of the ACM.

In other variations, the method includes calculating the energy transfer includes calculating energy transfer across a heat exchanger between the ram airflow and the ACM airflow. The failure prediction model for failure of the ACM is an ACM efficiency rising above 125 percent (%). Additionally or alternatively, the failure prediction model for failure of the ACM is an ACM efficiency is below 25 percent (%).

Also disclosed herein is an air Cycle Machine (ACM) failure alert system. The system may include an ACM ducting system disposed in an ACM system having air received from an air supply system of an aircraft. The system may further include an ACM compressor having an inlet and an outlet, the ACM compressor receiving the ACM airflow at the ACM compressor inlet. The system may further include a ram airflow system including air received from an exterior of the aircraft, the ram airflow system separate from the ACM ducting system and a heat exchanger having a first side and a second side, the heat exchanger disposed between the ram airflow system and the ACM airflow system. The ram airflow system may be disposed on one of the first side and the second side and the ACM airflow system disposed on the other of the first side and the second side. The system may also include at least one sensor disposed in the ram airflow system and a processor. The processor configured to: calculate energy of the air in the ACM airflow system at the inlet and the outlet of the ACM compressor, a rotational kinetic energy of the ACM compressor, and an efficiency of the ACM compressor; and predict a failure state of the ACM system by comparing the efficiency of the air cycle compressor to a failure prediction model.

In some variations, the failure prediction model for failure of the ACM system is an ACM efficiency rising above 125 percent (%). Additionally or alternatively, the failure prediction model for failure of the ACM system is an ACM efficiency below 25 percent (%).

In other variations, calculating energy of the ACM airflow at the inlet of the ACM compressor is based on calculating energy transfer between the ram airflow and the ACM airflow across the heat exchanger, calculating the energy transfer based on a first ram airflow temperature, a second ram airflow temperature, a ram airflow mass flow rate, and an ACM airflow mass flow rate.

In additional variations, the processor may be further configured to initiate a maintenance action in response to predicting a failure state of the ACM system. For example, the maintenance action includes a breakaway torque check of the ACM system. In yet other variations, at least one sensor is a temperature sensor.

Also disclosed herein is a computer-implemented method of using machine learning for failure prediction in an Air Cycle Machine (ACM). The computer-implemented method includes collecting, at one or more processors, ACM feature data comprising physical characteristics data of aircraft components of the ACM, calculated ACM operation data, and/or calculated ACM efficiency data, the ACM feature data corresponding to aircraft runtime operation. The method may further include providing, by the one or more processors, the collected ACM feature data to a machine learning model trained using time series ACM feature training data comprising time series physical characteristics training data, time series calculated ACM operation training data, and time series calculated ACM efficiency training data, at least a portion of the time series ACM feature training data corresponding to ACM failure events, ACM performance degradation, and ACM performance normal, the machine learning model being trained to generate a ACM failure prediction score. Accordingly, the method may also include generating, using the machine learning model, the ACM failure prediction score and provide the ACM failure prediction score to a failure pattern analyzer. The failure pattern analyzer, by the one or more processors, may apply a heuristic to the ACM failure prediction score to determine an ACM failure prediction and generate a failure prediction report containing the ACM failure prediction. In some examples, generating the failure prediction report comprises storing, transmitting, and/or displaying the failure prediction reporting.

In some variations, generating the failure prediction report includes storing, transmitting, and/or displaying the failure prediction report including an identification of a predicted ACM failure and a predicted ACM failure timing. Additionally or alternatively, generating the failure prediction report includes storing, transmitting, and/or displaying the failure prediction report including an identification of a predicted failure type selected from the group consisting of an ACM bearings failure and an ACM blades failure. Also, generating the failure prediction report may include storing, transmitting, and/or displaying the failure prediction reporting including an identification of an ACM predicted failure type.

In yet other variations, the physical characteristics data comprises ACM speed and a change in ACM speed over time and the calculated ACM operation data comprises work of an ACM, kinetic energy (KE) of an ACM, rolling data of the work of the ACM, and rolling data of the KE of the ACM. Additionally, the ACM feature data comprises an ACM efficiency and a rolling ACM efficiency rolling over time. Additionally the heuristic may be selected from the group consisting of: a prediction score threshold value, an average prediction score over time, a prediction score pattern over time, and a rate of change in prediction score.

In further variations, the method includes obtaining the time series ACM feature training data from one or more data stores and providing the time series ACM feature training data to train the machine learning model. Also, the machine learning model may include a gradient boosting model. In some examples, the method includes applying the obtained time series ACM feature training data to a feature selection pipeline that performs recursive feature elimination (FRE) reducing a total number of ACM features in the time series ACM feature training data before providing the time series ACM feature training data to train the machine learning model.

Also disclosed herein is a non-transitory computer-readable medium, having stored thereon computer-executable instructions that, when executed by one or more processors. The computer-executable instructions cause a computer to collect ACM feature data comprising physical characteristics data of aircraft components of the ACM, calculated ACM operation data, and/or calculated ACM efficiency data, the ACM feature data corresponding to aircraft runtime operation. The instructions may also cause the computer to provide the collected ACM feature data to a machine learning model trained using time series ACM feature training data comprising time series physical characteristics training data, time series calculated ACM operation training data, and time series calculated ACM efficiency training data, at least a portion of the time series ACM feature training data corresponding to ACM failure events, ACM performance degradation, and ACM performance normal, the machine learning model being trained to generate a ACM failure prediction score. Further, the computer may generate, using the machine learning model, the ACM failure prediction score and provide the ACM failure prediction score to a failure pattern analyzer; and by the failure pattern analyzer, apply a heuristic to the ACM failure prediction score to determine an ACM failure prediction. As a result, the computer-executable instructions may cause the computer to generate a failure prediction report containing the ACM failure prediction, wherein generating the failure prediction report comprises storing, transmitting, and/or displaying the failure prediction reporting.

BRIEF DESCRIPTION OF THE DRAWINGS

The present disclosure may be best understood by reference to the following description taken in conjunction with the accompanying drawings, in which.

Figure 1:
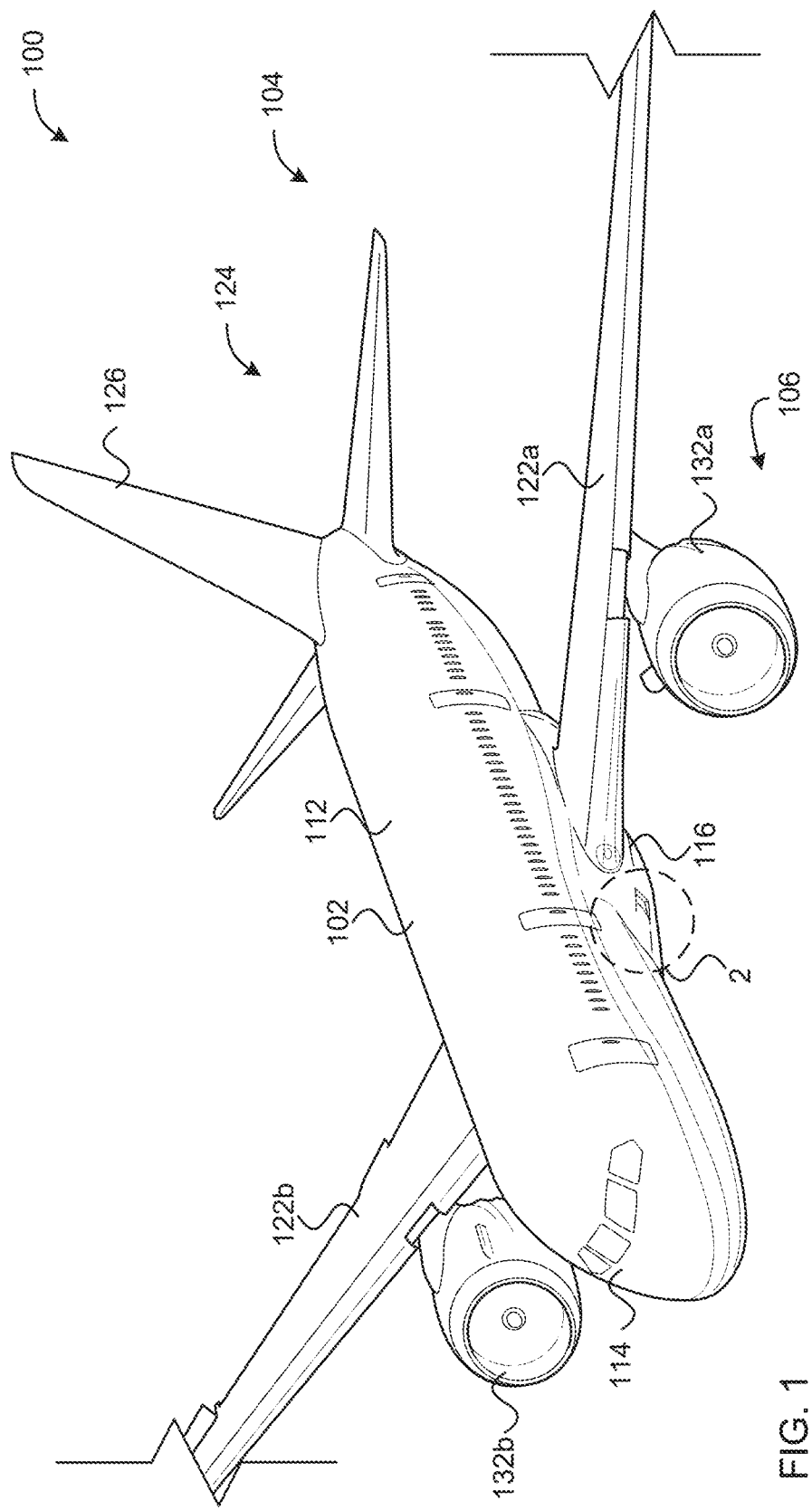
FIG. 1 illustrates a perspective view of an aircraft, in accordance with an example.

The figures depict preferred embodiments for purposes of illustration only and are not to scale. One skilled in the art will readily recognize from the following discussion that alternative embodiments of the systems and methods illustrated herein may be employed without departing from the principles described herein.

DETAILED DESCRIPTION

Aircraft air conditioning systems, such as the Air Cycle Machine (ACM) of the present disclosure, are vital components of modern commercial aviation. The ACM is a sub-component of a pneumatic air conditioning system (sometimes referred to as a "PACK system"). Without such air conditioning systems, commercial flights would be restricted to substantially lower altitudes, and the aircraft cabin environment would be uncomfortable. To provide the necessary fuselage pressurization and comfortability, aircraft air conditioning systems include various compressors, heat exchangers, valves, sensors, and motors. Each component of the air conditioning system must operate properly for the air conditioning system to provide adequate air pressure at appropriate temperatures.

As referenced above, failure in ACM systems, while not common, can occur. Such failures can result in an aircraft being grounded, causing delays, expensive maintenance actions, and the like. Failure in the ACM system can result in uncomfortable flying experiences for passengers, including an uncomfortably warm cabin. The problem can be exacerbated in larger aircraft which may include several ACM systems, where degrading performance in one ACM may accelerate the degradation in another ACM which attempts to compensate for the performance drops.

Typically, an ACM system fails due to compressor failure. Compressors typically fail in one of two ways. Typically, either the bearings or the blades of the ACM compressor fail. If the bearings fail, the ACM compressor fails to properly spin and compress air. Alternatively, if the blades of the ACM compressor fail, the blades could rub against the compressor housing and generate excessive heat, break compressor blades, and cause excessive damage throughout the system. Trying to detect failures and identify the particular failure type is technologically challenging. For example, to identify failure in the compressor bearings or compressor blades, a maintenance technician might need to physically inspect the components. Physical inspection of the components may be time consuming and require maintenance expertise in the overhaul of the ACM system.

The present techniques are able to overcome the technological challenges of conventional ACM systems. For example, in accordance with the present disclosure, identifying a failure in the ACM is possible without any direct sensor measurement readings relating to the state and operating condition of a compressor of an ACM. Further, using said indirect sensor measurement, it is possible to predict the failure of the ACM more than thirty cycles before the failure occurs. As used herein, the term, "cycle" corresponds to a flight of an aircraft including a takeoff, a cruise, and a landing. However, in various other examples, the failure prediction can be measured in days, flight hours, or any other comparable measurement.

In accordance with the teachings of the present disclosure, analysis of the efficiency of the ACM compressor can be used to predict failure of the ACM compressor. Furthermore, the efficiency of the ACM compressor can be measured without taking any direct sensor measurements of the ACM compressor but only relying on sensors already disposed in an aircraft air conditioning system.

FIG. 1 illustrates an airplane 100, such as the Boeing 787, but could be any airliner or commercial aircraft. The airplane 100 includes an aircraft body 102, aerodynamic surfaces 104, and engines 106. However, in various examples, the airplane 100 could be any other airliner or a variant of the same airliner. In various examples, the airplane 100 could include various sensors and systems (not shown) common and typical in commercial airliners. These sensors and systems can include temperature and pressure sensors, configured to measure the ambient temperature and air pressure conditions. As used herein, ambient means relating to the immediate surrounds of the aircraft.

The aircraft body 102 includes a fuselage 112 having a cockpit 114. Additionally, the aircraft body 102 can include structural components, include a wing/body fairing 116 to couple the aerodynamic surfaces 104 to the aircraft body 102. The wing/body fairing 116 is a structural component configured to handle the stresses of transferring the lift forces generated on the aerodynamic surfaces 104 to the fuselage 112. Further, the wing/body fairing 116 can include various aircraft equipment described in greater detail in connection with FIG. 2.

The fuselage 112 could be configured to carry passengers and/or cargo. The airplane 100 is designed to fly at altitudes between approximately 30,000 feet (ft.) and 43,000 ft. altitude above sea level. At such altitudes, the aircraft body 102 needs to be pressurized for the health of all passengers and aircraft crew and also prevent hypoxia. For example, normal air pressure at sea level is approximately 14.7 pounds per square inch absolute (psia), while typical air pressure at 35,000 ft. is approximately 3.46 psia. The aircraft body 102 could be pressurized to an air pressure corresponding to between approximately 6,000 ft. (approximately 11.8 psia) and 8,000 ft. (approximately 10.9 psia) altitude above sea level. The airplane 100 can fly at a wide range of altitudes, and the properties of the air varies based on the altitude, as shown in Table 1.

TABLE 1

| Altitude (feet (ft.)) | Average Temperature (Fahrenheit (° F.)) | Average Pressure (Pounds per square inch absolute (psia)) | Average Density (pounds per cubic foot (lbs/ft$^3$)) |
|---|---|---|---|
| 0 (Sea Level) | 59.0 | 14.7 | 0.077 |
| 20,000 | −12.3 | 6.8 | 0.041 |
| 30,000 | −47.8 | 4.4 | 0.039 |
| 35,000 | −65.6 | 3.5 | 0.024 |
| 40,000 | −69.7 | 2.7 | 0.019 |
| 45,000 | −69.7 | 2.1 | 0.015 |

The aerodynamic surfaces 104 of the airplane 100 includes a first wing 122a, second wing 122b, horizontal stabilizers 124, and a vertical stabilizer 126. The aerodynamic surfaces 104 provide the necessary lift to get the airplane 100 airborne. Additionally, the aerodynamic surfaces 104 include control surfaces to control the attitude, yaw, and roll of the aircraft during flight. Such control surfaces can include, but are not limited to, ailerons, flaps, elevators, and rudders.

Additionally, the airplane 100 includes engines 106 configured to generate sufficient thrust for takeoff and cruise. In the example of FIG. 1, the airplane includes a first turbofan engine 132a and a second turbofan engine 132b. Although illustrated with two engines, the airplane 100 could be configured to fly with one engine, three engines, or four or more engines. Further, the engines 106 could be piston engines, turbojet engines, turboprop engines, or any other known aircraft engine.

Figure 2:
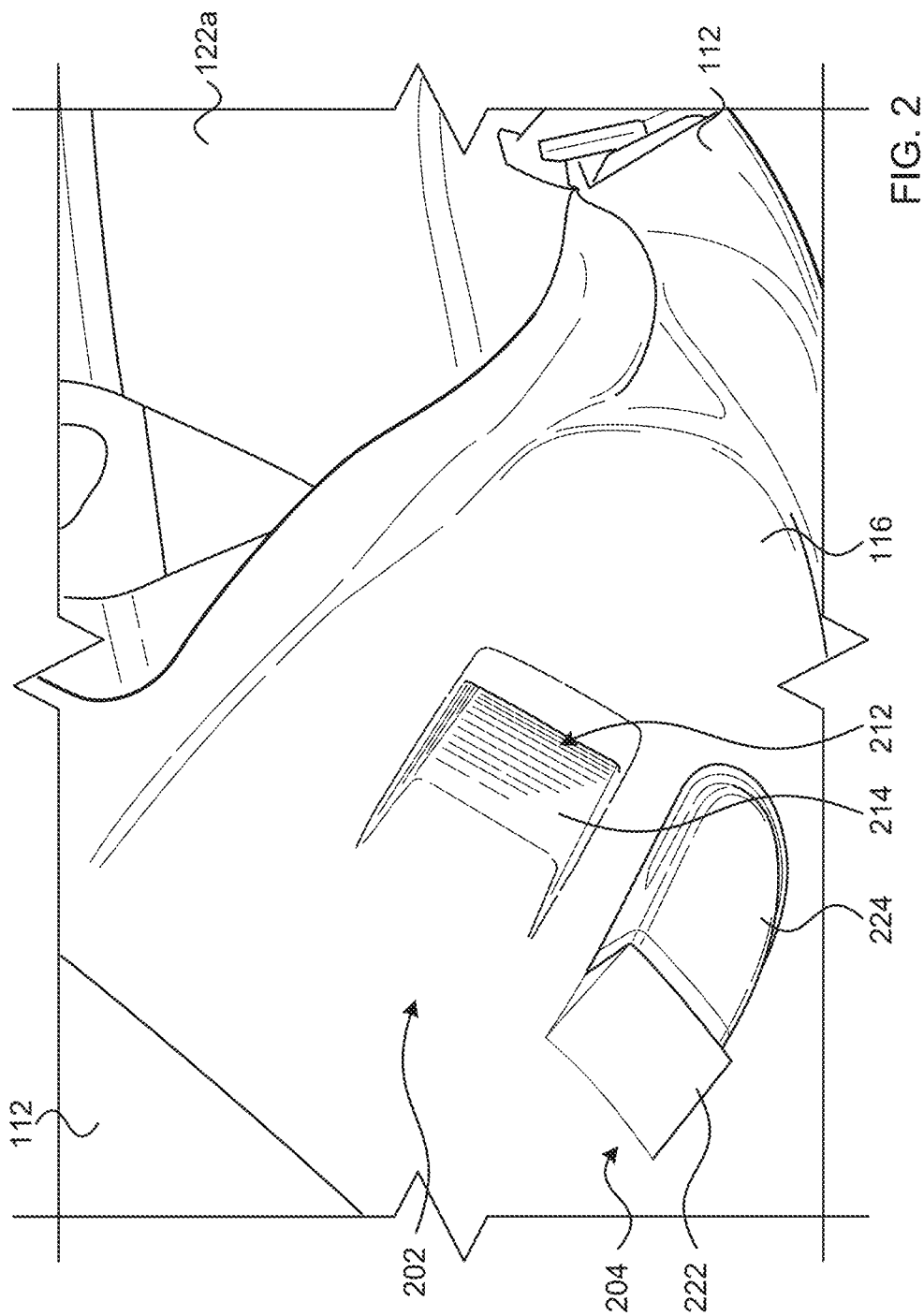
FIG. 2 illustrates a perspective view of a ram air inlet and a cabin air compressor inlet of the aircraft of FIG. 1, in accordance with an example.

FIG. 2 illustrates a ram air inlet 202 and a cabin air compressor (CAC) inlet 204 disposed on the wing/body fairing 116. In the present example, the ram air inlet 202 and the CAC inlet 204 are disposed on the wing/body fairing 116, but the ram air inlet 202 and/or the CAC inlet 204 can be disposed elsewhere on the aircraft body 102 or aerodynamic surfaces 104 of the airplane 100.

The ram air inlet 202 includes an inlet 212 and an inlet door 214. The inlet door 214 includes an actuator to control the inlet door 214 position relative to the inlet 212. By controlling the position of the inlet door 214 relative to the inlet 212, airflow through a ram airflow system (discussed in greater detail in connection with FIGS. 4 and 5) can be controlled. In some examples, the inlet 212 includes a minimum open area that remains open even when the inlet door 214 is fully actuated. In such examples, the inlet 212 can never be fully closed.

The CAC inlet 204 includes a CAC inlet deflector door 222 and an inlet 224. The CAC inlet deflector door 222 is actuatable to cover the inlet 224. When the inlet deflector door 222 is deflected out to cover the inlet 224, air does not pass into the CAC air system (discussed in greater detail in connection with FIG. 3) and the ACM system (discussed in greater detail in connection with FIGS. 4 and 6)

Figure 3:
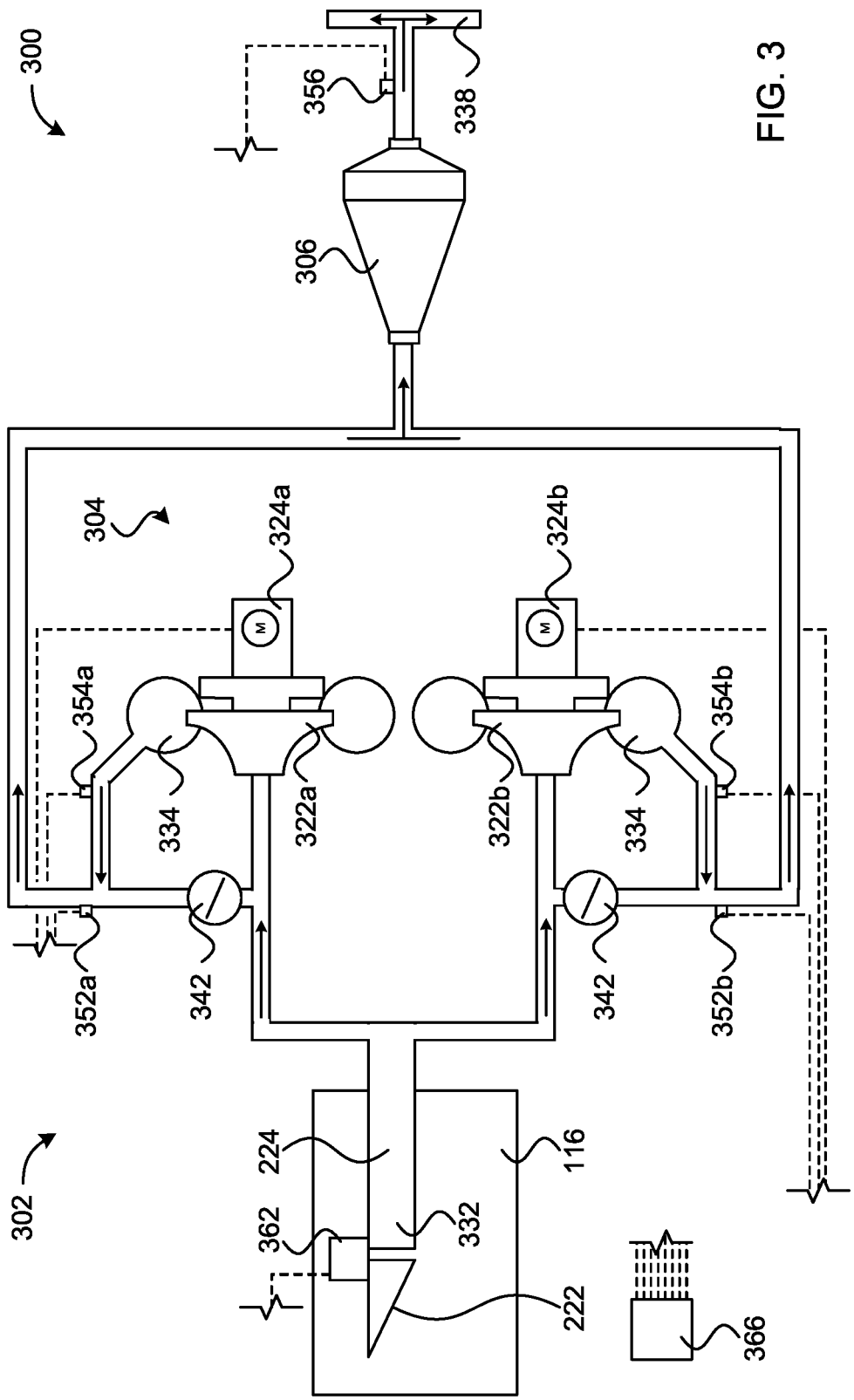
FIG. 3 illustrates a schematic of a cabin air compressor system used in accordance with the present disclosure, in accordance with an example.

FIG. 3 illustrates a CAC system 300 which generally constitutes an air supply system for the airplane 100 of FIGS. 1 and 2. The example CAC system 300 includes ducting 302, compressors 304, and other air processing systems 306. In the example of FIG. 3, the CAC system 300 includes two compressors 304 and symmetrical ducting 302. In various examples, the CAC system 300 could include asymmetrical ducting 302, only includes a single compressor 304, or more than two compressors 304. Additionally, the CAC system 300 could include air processing systems 306, such as an ozone converter, but could include any equipment necessary to process air before passing on to the ACM system.

The CAC system 300 of the present example includes a first compressor 322a and a second compressor 322b powered by motor 324a and 324b, respectively. In some examples, only one compressor 322a, 322b is in operation while the other compressor 322a, 322b idles or is inactive. Air enters the CAC system through the inlet 224 at ambient pressure 332 and proceeds through the compressors 322a, 322b and is pressurized 334 before passing through ducting 338 to the ACM system (discussed in greater detail in connection with FIG. 4). The ambient pressure 332, could be the ambient air pressure outside the airplane 100 during cruise at between approximately 30,000 ft. and approximately 40,000 ft. (e.g., approximately 4.3 psia to approximately 2.7 psia, respectively). And pressurized air 334 could be closer to the fuselage pressure (e.g., approximately 8 psia to approximately 11 psia). In some examples, the valves 342 can be opened to control the flow, pressure, and temperature of the air passing through the compressors 322a, 322b.

The CAC system 300 may further include sensors to assist in the control of the CAC system 300. For example, the CAC system 300 can include temperature sensors 352a, 352b, pressure sensors 354a, 354b, and flow sensors 356. The pressure sensors 354a, 354b can measure a pressure of the pressurized air 334 exiting the compressors 324a, 324b. Additionally, the temperature sensors 352a, 352b measures the temperature of the pressurized air. If the temperature of the pressurized air 334 is too low, the valves 342 can be, at least partially, opened to further pressurize and increase the temperature of the pressurized air 334. Additionally, the flow sensor 356 can measure the flow rate of pressurized air 334 passing through the CAC system 300. If the flow rate of the pressurized air 334 is too high, the inlet deflector door can be actuated by actuator 362 to cover the inlet 224. Alternatively, if the flow rate is too low, the inlet deflector door can be actuated by actuator 362 to not cover the inlet 224.

Figure 11:
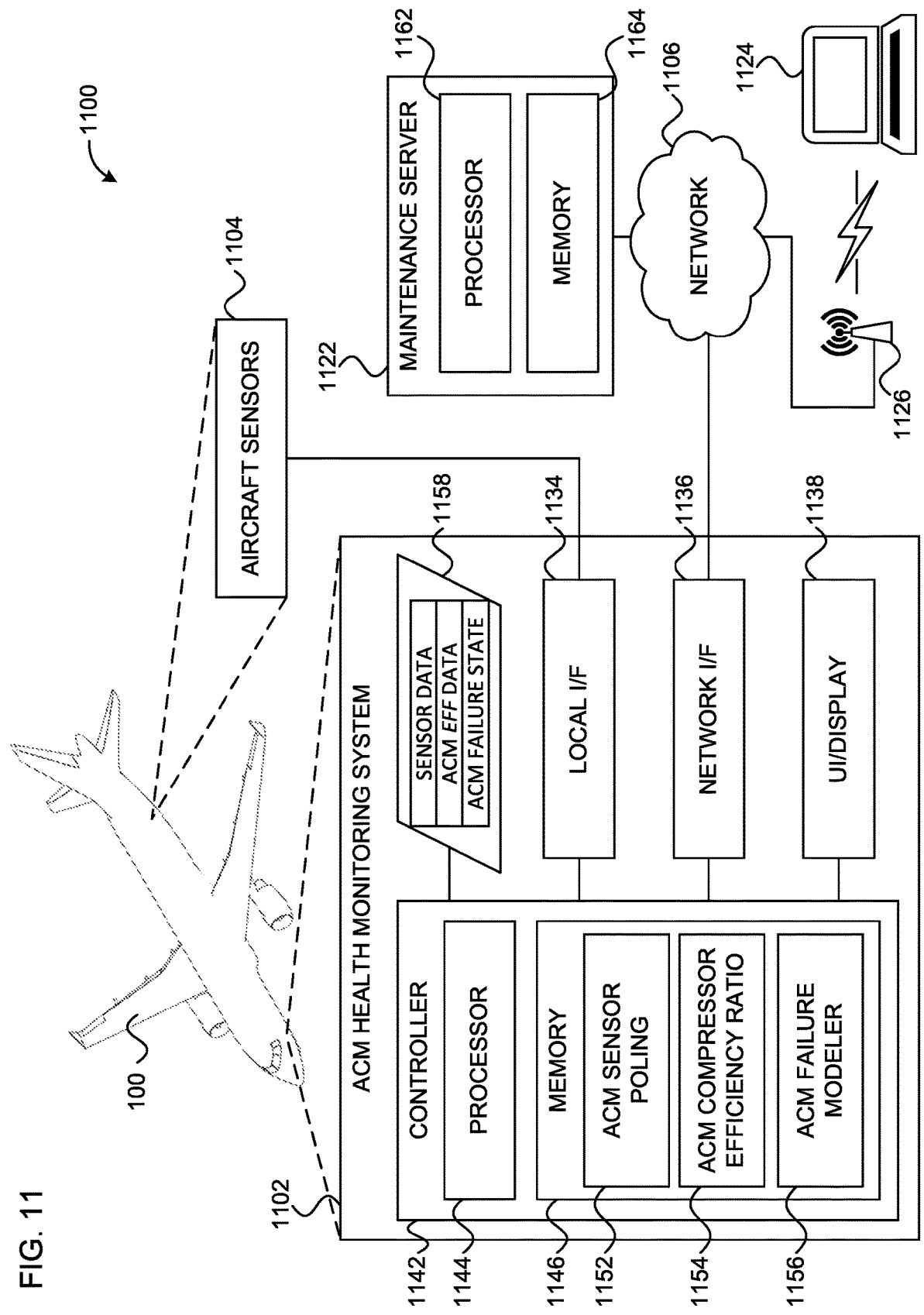
FIG. 11 is a block diagram of an exemplary system for operating an ACM health monitoring system, in accordance with an example.

Additionally, the motors 324a, 324b and the actuator 362 in addition to the temperature sensors 352a, 352b, pressure sensors 354a, 354b, and flow sensor 356 (collectively, the CAC sensors) may be in electronic communication with a computing device 366 (discussed in greater detail in FIG. 11). Additionally, the computing device 366 may send control signals to various components of the CAC system 300, such as the motors 324a, 324b and the actuator 362. As a result, the computing device 366 can send a control signal to the actuator 362 to cover the inlet 224 to reduce flow rate in the CAC system 300 or to uncover the inlet 224 to increase flow rate. Alternatively, the computing device 366 can send a control signal to increase or decrease the pressure generated by compressors 322a, 322b by adjusting a speed of motors 324a, 324b respectively, or by opening the valves 342.

Figure 4:
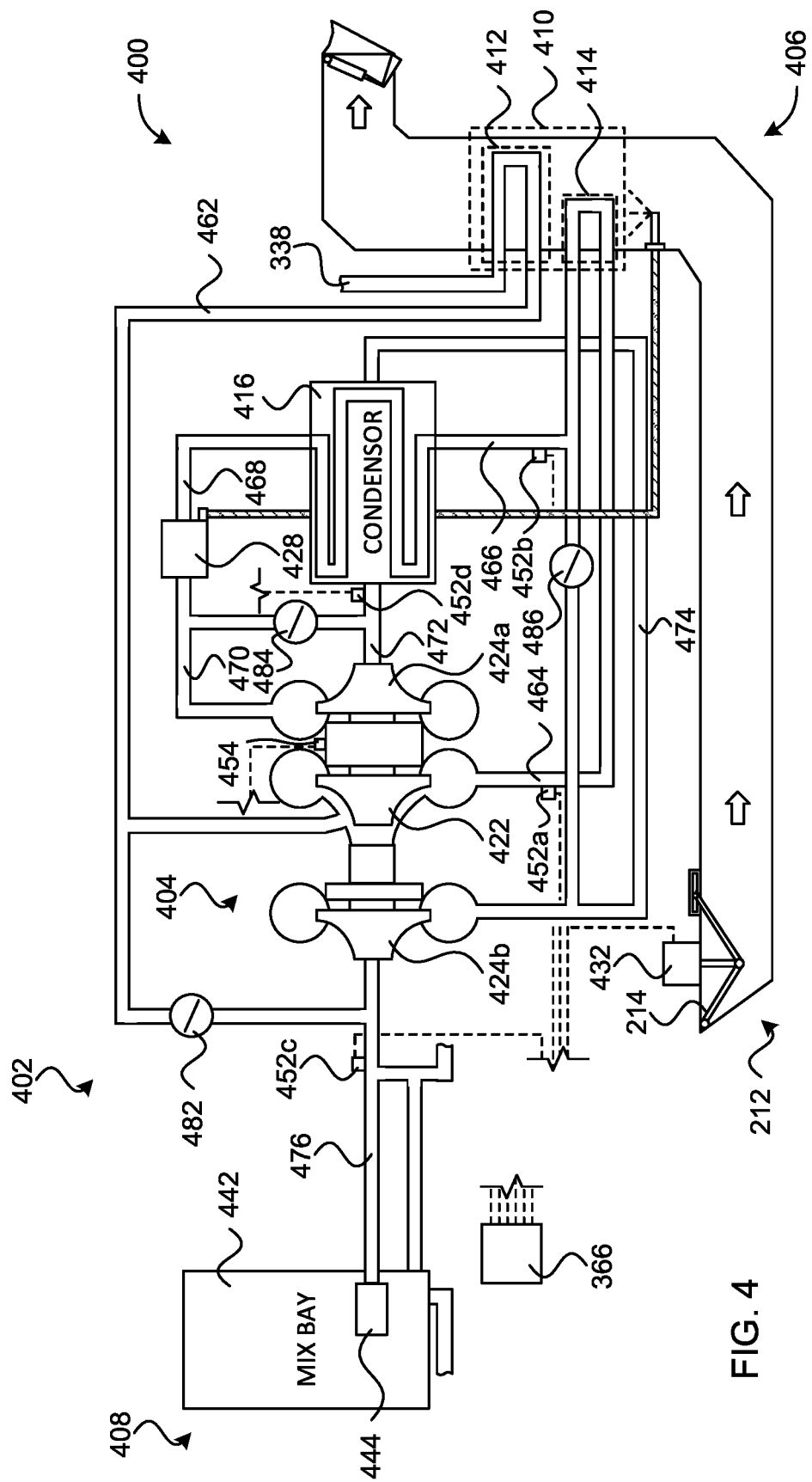
FIG. 4 illustrates a schematic of a pneumatic air conditioning (PACK) system of the aircraft of FIG. 1, in accordance with an example.

FIG. 4 illustrates an example pneumatic air conditioning (PACK) system 400 of the airplane 100 of FIG. 1. The PACK system 400 includes a ducting system 402, an air cycle machine (ACM) 404, a cold air supply 406 (also referred to as a ram air system), and an air distribution system 408. Only one PACK system 400 is illustrated in FIG. 4, but some airliners may have two or more PACK systems.

The ducting system 402 fluidly couples the CAC system 300 via the ducting 338 to the air cycle machine 404. Additionally, the ducting system 402 fluidly couples the air cycle machine 404 to the air distribution system 408 and includes a first heat exchanger 412, a second heat exchanger 414, and a condenser 416. Based on the operation of the air cycle machine 404; the first and second heat exchangers 412, 414; and condenser 416, the temperature and pressure of airflow passing through the PACK system 400 can be controlled.

The air cycle machine 404 includes an ACM compressor 422, a first ACM turbine 424a, a second ACM turbine 424b, and the condenser 416. The air cycle machine 404 may also include a water extraction system 428 to gather water condensation generated in various stages of cooling and/or pressure reduction. The air cycle machine 404 can be utilized to control the pressure and temperature of air provided to the aircraft fuselage 112. Controlling the airflow through the CAC system 300 and the PACK system 400 via actuation of the CAC inlet deflector door 222 and controlling the speed of the CAC compressors 322a, 322b and/or the speed of the ACM compressor 422, the first ACM turbine 424a, and the second ACM turbine 424b.

The cold air supply 406 receives ambient air through the inlet 212. Ambient air can be used for a variety of aircraft systems, including a nitrogen generation system. As shown in the present example, the first and second heat exchangers 412, 414 are at least partially disposed in the cold air supply 406. In some examples, the first and second heat exchangers could be integrated as one heat exchanger. Additionally, while shown as conduit disposed in the cold air supply 406, the first and second heat exchangers 412, 414 may include any common type of heat exchanger (e.g., plate heat exchanger, finned heat exchanger, etc.) As a result, the air passing through the cold air supply 406 passes over a first side of the first and second heat exchangers 412, 414 to cool air on a second side of the first and second heat exchangers 412, 414 passing through the PACK system 400. The flow rate through the cold air supply 406 is, at least partially controlled based on the airspeed of the airplane 100, altitude of the airplane 100, and position of the inlet door 214 controlled by inlet door actuator 432. For example, the volumetric flow rate through the cold air supply 406 can be calculated based on the airspeed of the aircraft and the cross sectional area of the inlet 212 not obstructed by the inlet door 214. Additionally, the mass flow rate can be calculated based on the air speed of the aircraft or the corresponding Mach number. But, in some examples, the mass flow rate can be calculated based on the volumetric flow rate and the known density of the ambient air outside the aircraft either from sensors on the aircraft or estimated air density values based on altitude.

The air distribution system 408 of the ACM system can include a mix bay 442 and a plenum manifold 444. In the mix bay 442, air from the PACK system 400 can be diverted to various areas and systems of the airplane 100. For example, the plenum manifold 444 can direct conditioned air from the PACK system 400 to the fuselage 112 for the health and comfort of airplane 100 passengers and crew.

To manage and control the PACK system 400, the PACK system 400 includes a variety of sensors. For example the PACK system 400 includes temperature sensors 452a, 452b, 452c, and 452d and ACM speed sensor 454. The temperature sensor 452a measures ACM compressor 422 outlet temperature, the temperature sensor 452b measures the temperature immediately after the air passes through the second heat exchanger 414, the temperature sensor 452c measure the temperature after the second ACM turbine 424b, and the temperature sensor 452d measures the condenser inlet temperature. Any of the temperature sensors 452a, 452b, 452c, and 452d may comprise any common temperature sensor used in the aerospace industry. For example, each sensor could include a dual-element temperature sensor and the computing device 366 can average the temperature data measured at each element.

In a preferred embodiment, pressurized air passes from the CAC system 300 of FIG. 3 through the ducting 338 to the first heat exchanger 412, the first heat exchanger is partially disposed in the cold air supply 406. In the first heat exchanger 412, the pressurized air is cooled down. The pressurized air then passes from the first heat exchanger, through ducting 462 to the ACM compressor 422, where the pressurized air is further pressurized and also heated again. From the ACM compressor 422, the pressurized air passes through ducting 464 to the second heat exchanger 414, to cool the pressurized air again. Pressurized air passes from the second heat exchanger 414 through ducting 466, the condenser 416, and ducting 468 to a water extraction unit 428. The water extraction unit 428 is configured to extract and dispose of water that condensed out of the pressurized air. After the water extraction unit 428, the pressurized air passes through ducting 470 to the first ACM turbine 424a. In the ACM turbine 424a, the pressurized air is partially depressurized and cooled. The pressurized air is then passed through ducting 472 to the condenser 416 where the cooled air cools the air passing from ducting 466 to ducting 468. The pressurized air then continues through ducting 474 to the second ACM turbine 424b. The pressurized air is there further depressurized and cooled. The pressurized air then passes through ducting 476 to the mixing bay 442 and the plenum manifold before being distributed to the fuselage 112.

Additionally, the temperature sensors 452a, 452b, 452c, 452d and the ACM speed sensor 454 (collectively, the ACM sensors) may be in electronic communication with the computing device 366 (discussed in greater detail in FIG. 11). Additionally, the computing device 366 may send control signals to various components of the PACK system 400. For example, the computing device 366 may control the PACK system 400 by opening and closing a bypass valve 482, a low-limit valve 484, and/or an economy cooling valve 486. For example, opening the bypass valve 482 results in less flow to the mix bay 442 but higher temperature. In contrast, closing the bypass valve 482 results in greater flow to the mix bay 442 at a lower temperature. The low-limit valve 484 opens to prevent water from freezing in the condenser. Lastly, the economy cooling valve can be opened to adjust for air moisture at different points in the flight and the ACM turbines 424a, 424b (electrical lines not shown). As a result, the computing device 366 can control the pressure and temperature throughout the PACK system 400.

Figure 5:
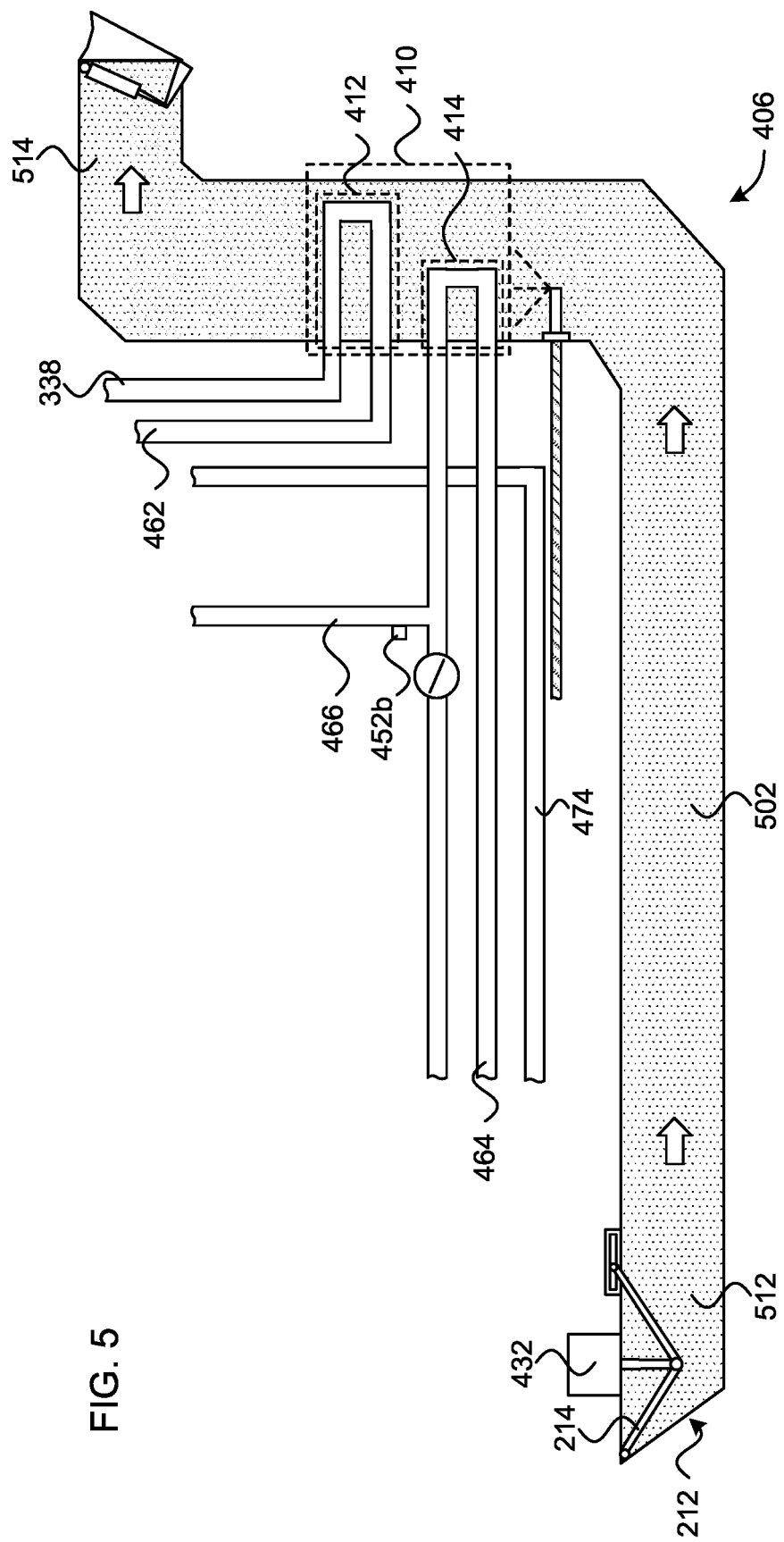
FIG. 5 illustrates a schematic of the ram air system of the aircraft of FIG. 1 and FIG. 4, in accordance with an example.

FIG. 5 illustrates the cold air supply 406 of the example airplane 100 of FIG. 1. The cold air supply 406 includes a ram airflow 502. The ram airflow 502 is defined by properties substantially identical to ambient air properties (i.e., air having properties corresponding to the environment disposed outside the aircraft). For example, if the example airplane 100 is flying at 35,000 feet (ft.), the air could be between −40 degrees Fahrenheit (° F.) and −75° F., could be defined by an air pressure of approximately 3.47 pounds per square inch absolute (psia), and a density of approximately 0.024 pounds per cubic foot (lbs/ft$^3$). An inlet air condition 512 may be substantially identical to the properties of ambient air outside the aircraft, such as the foregoing properties. However, in some examples, the ram airflow 502 may be altered by entering into the cold air supply 406. As used herein, "substantially identical" means the compared subjects are identical or could have measured differences within 5-10% of each other.

One use of the cold air supply 406 is to operate as a cold side of the first heat exchanger 412 and the second heat exchanger 414. Using temperature measurements in the PACK system 400 before and after either the heat exchanger 414 and/or the heat exchanger 412, it is possible to calculate an energy transfer across one or both heat exchangers 412, 414. Based on the energy transfer across the heat exchangers 412, 414, the inlet air condition 512 is different from the outlet air condition 514. For example, the outlet air condition 514 is warmer after absorbing thermal energy from the first and second heat exchangers 412, 414.

Figure 6:
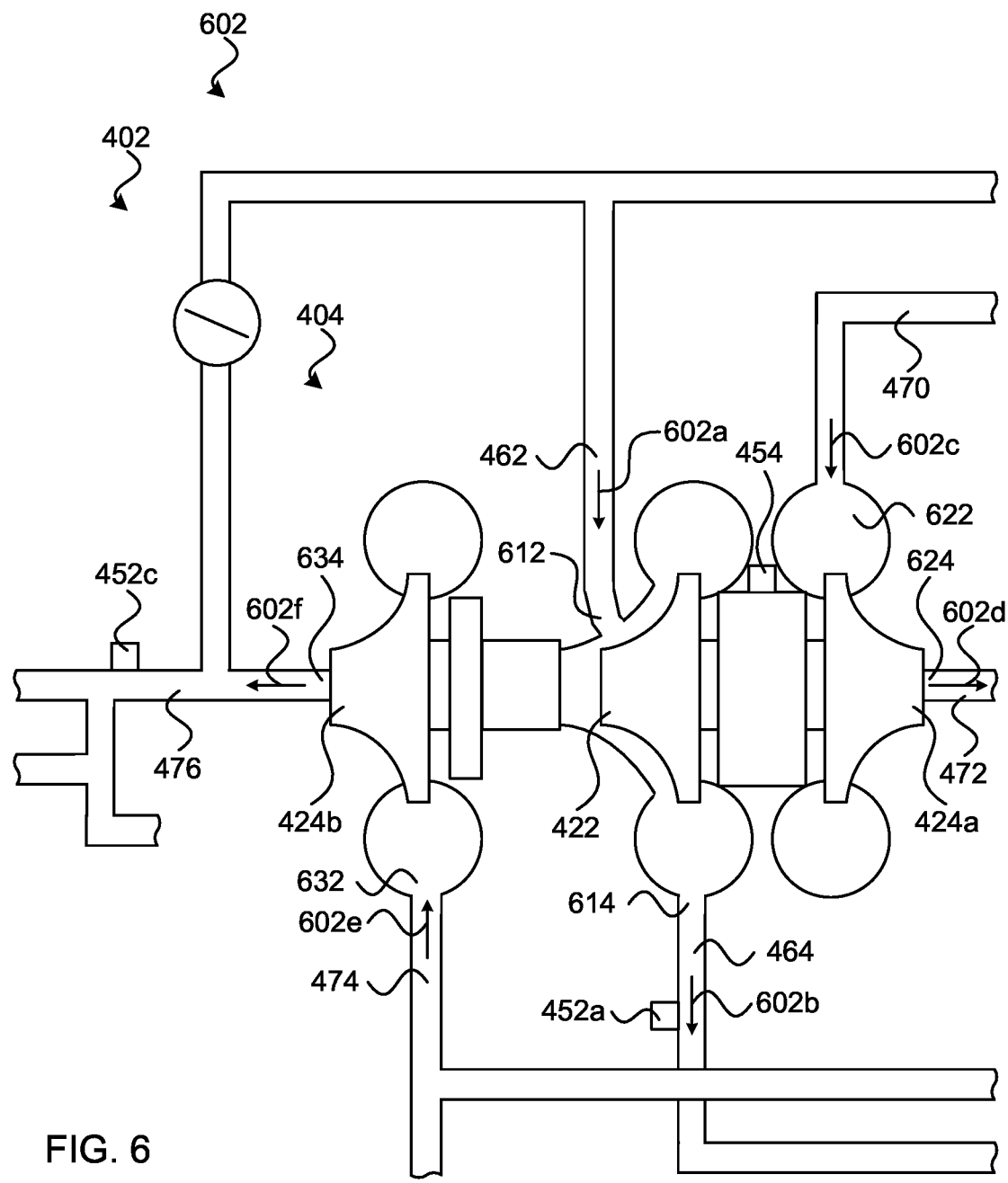
FIG. 6 illustrates a schematic of the air cycle machine (ACM) of the aircraft of FIG. 1 and FIG. 4, in accordance with an example.

FIG. 6 illustrates a schematic of the air cycle machine 404 of FIG. 4. The air cycle machine 404 includes temperature sensors 452a and 452c that measure the air temperature exiting the ACM compressor 422 and the second ACM turbine 452c, respectively. Additionally, the air cycle machine includes the ACM speed sensor 454 capable of measuring the rotational speed of the ACM compressor 422, first ACM turbine 424a, and/or the second ACM turbine 424b.

FIG. 6 illustrates an example flowpath of an ACM airflow 602 through the air cycle machine 404. For example, an ACM airflow 602a first passes through ducting 462 to the inlet 612 of the ACM compressor 422. Then, an ACM airflow 602b passes through an ACM outlet 614 into ducting 464 as further compressed air, as discussed in connection with FIG. 4. The airflow 602b has a higher pressure and temperature relative to the ACM airflow 602a. Additionally, the temperature of the ACM airflow 602b can be measured by, for example, the temperature sensor 452a.

Subsequently, the ACM airflow 602c, after passing through a condenser 416 and water extractor 428 (as discussed in connection with FIG. 4), enters an inlet 622 of the first ACM turbine 424a. The ACM airflow 602d then passes through an outlet 624 of the first ACM turbine to return back to the condenser 416. The ACM airflow 602d is generally colder and has less pressure than ACM airflow 602c.

Further, the ACM airflow 602e passes into the second ACM turbine 424b through an inlet 632. The ACM airflow 602f then exits the second ACM turbine 424b through outlet 634 and into the ducting 476. The ACM airflow 602f is generally cooler and at a lower pressure than the ACM airflow 602e. The temperature of the ACM airflow 602f can be measured by, for example, temperature sensor 452c.

Figure 7:
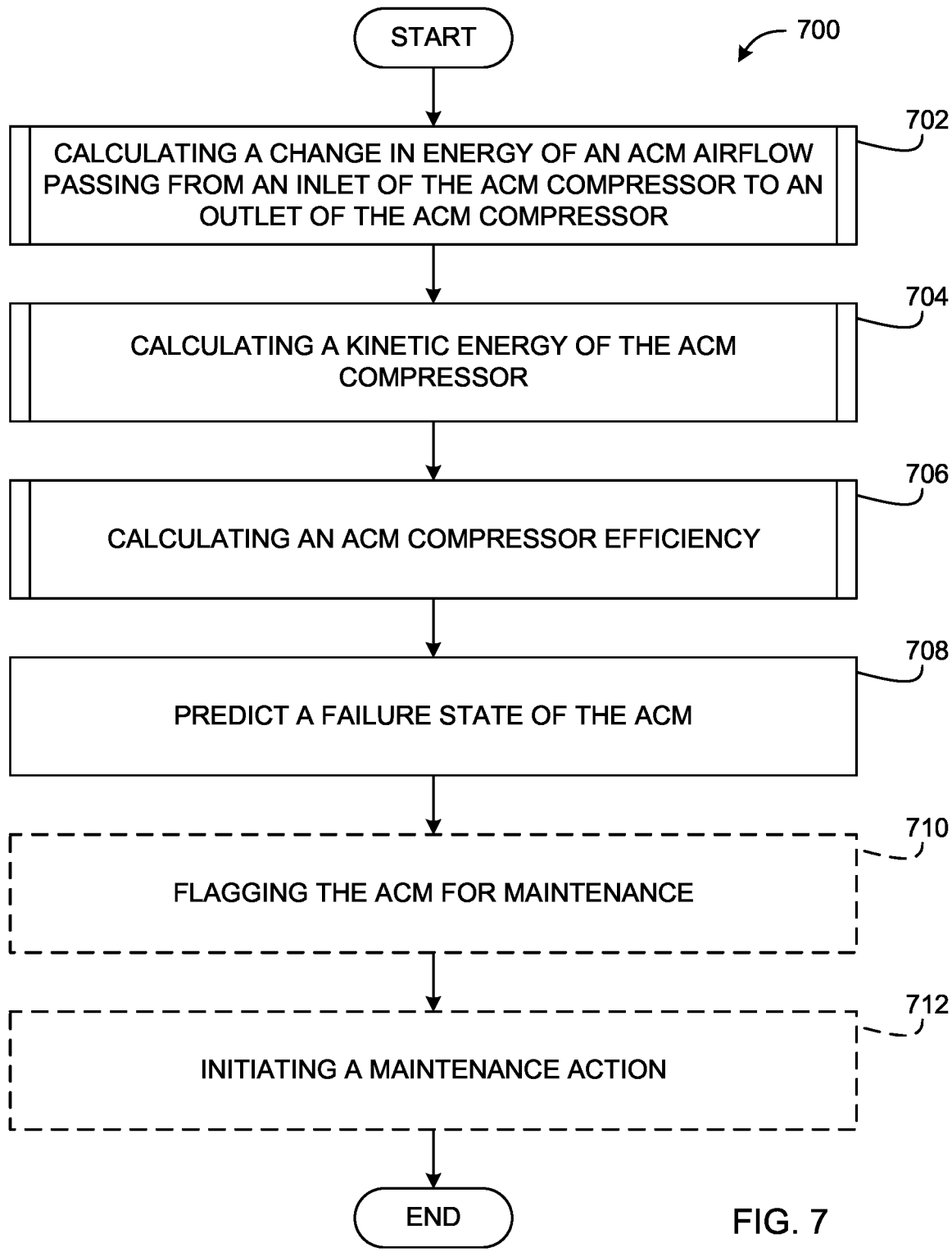
FIG. 7 is a flowchart illustrating an example method for predicting a failure state of an ACM compressor, in accordance with an example.
Figure 8:
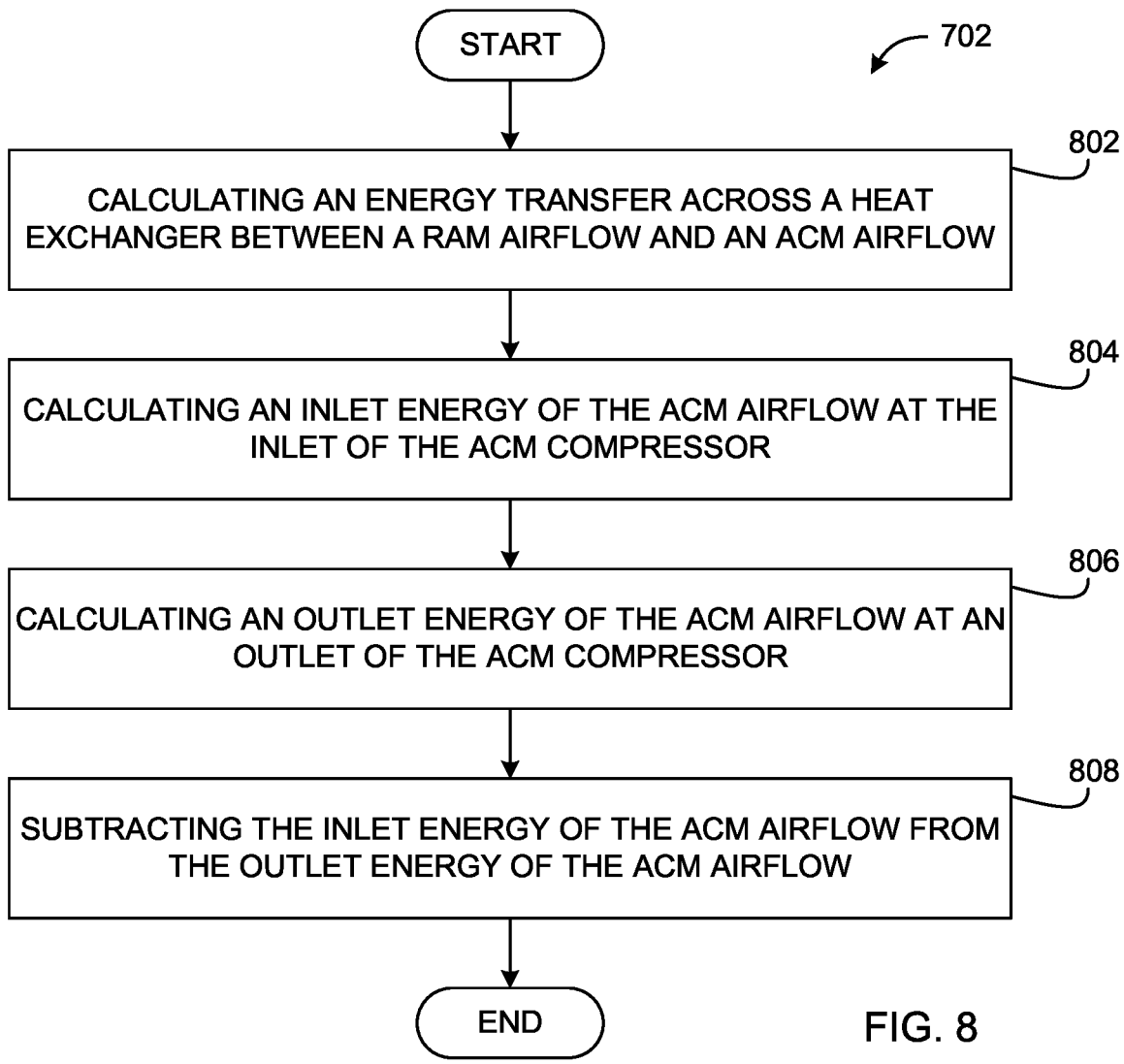
FIG. 8 is a flowchart illustrating an example method for calculating a change in energy of an airflow across the ACM compressor, in accordance with an example.
Figure 9:
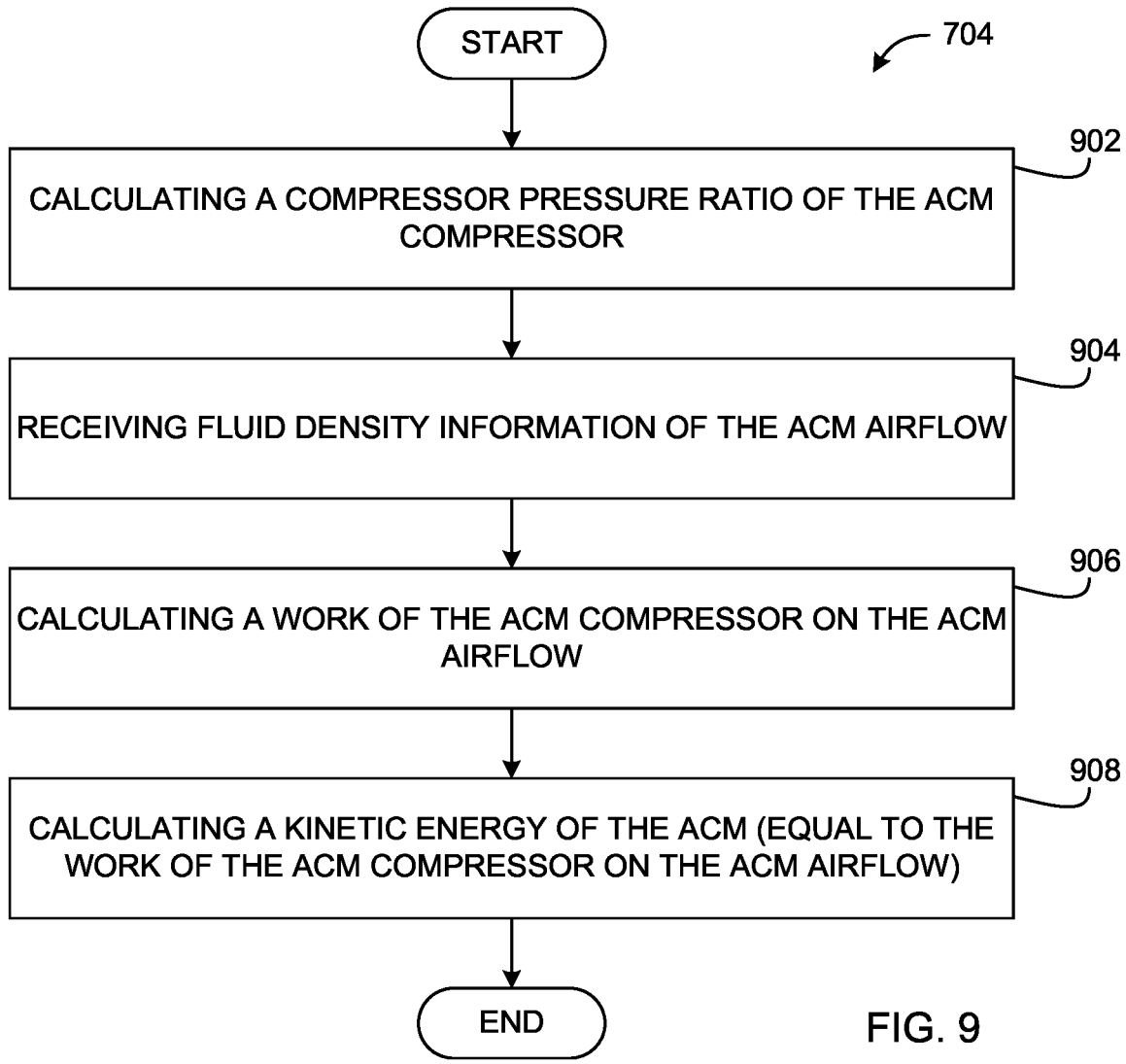
FIG. 9 is a flowchart illustrating an example method for calculating a kinetic energy of the ACM compressor, in accordance with an example.
Figure 10:
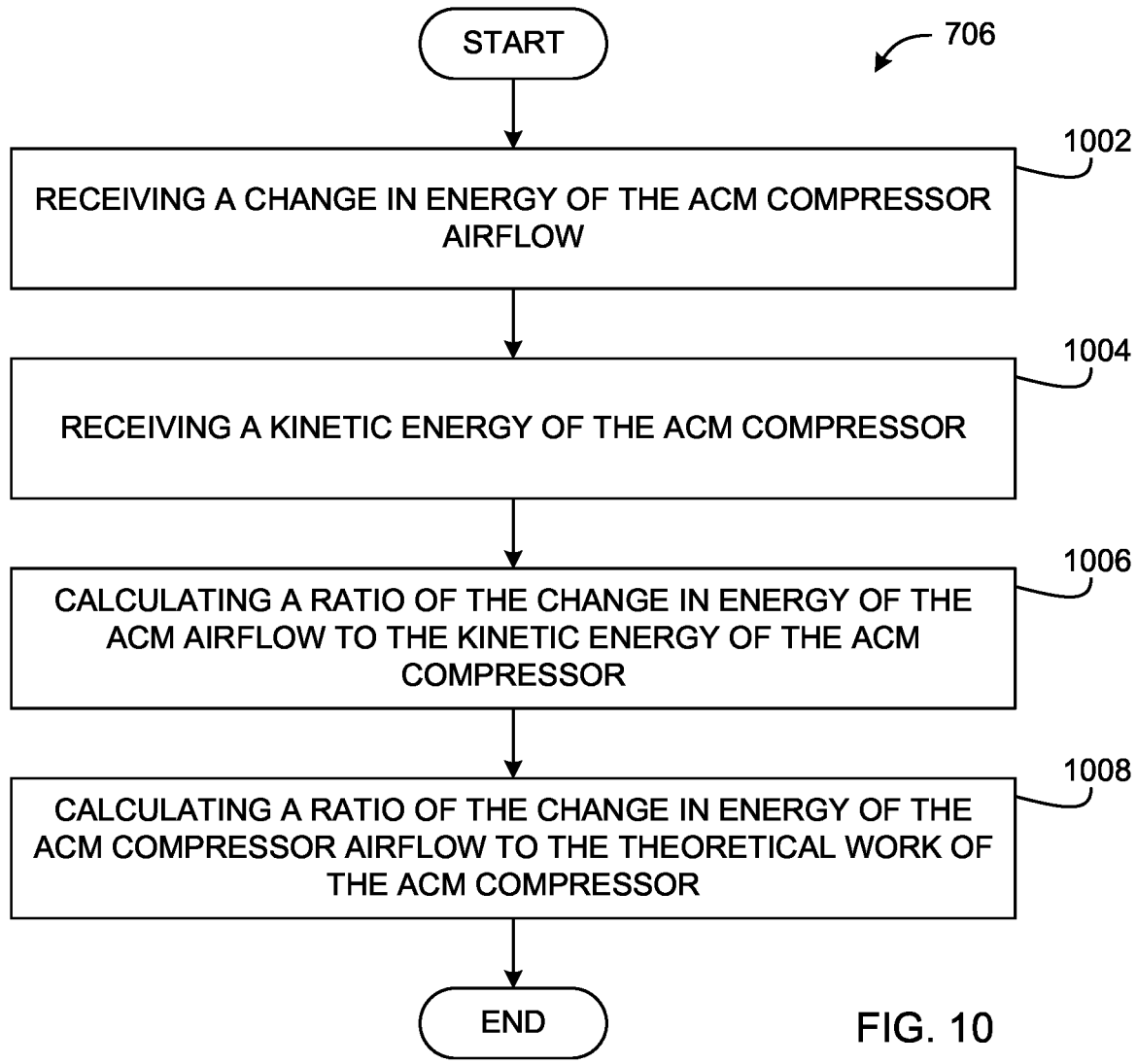
FIG. 10 is a flowchart illustrating an example method for calculating an ACM compressor efficiency, in accordance with an example.

FIGS. 7-10 illustrate example methods for failure prediction in an Air Cycle Machine (ACM), such as the ACM compressor 422 of FIGS. 4-6. FIG. 7 illustrates a method 700 for failure prediction in the ACM, with FIGS. 8-10 illustrate example implementations of various processes in the method 700. While the method 700 is described as including steps performed once and in a particular order, in various other examples, the processes of the methods in FIGS. 7-10 can be reordered and/or performed multiple times. Additionally the methods in FIGS. 7-10 can, in various examples, be performed by the ACM health monitoring system 1102 described in greater detail in connection with FIG. 11. For example, a processor 1144 of the ACM health monitoring system 1102 can perform all calculations described in connection with FIGS. 7-10.

At a block 702, the method 700 includes calculating a change in energy of an ACM airflow passing from an inlet of the ACM compressor to an outlet of the ACM compressor. In some examples, the energy of the ACM airflow at the inlet is measured via sensors or is calculated based on an energy transfer across the heat exchanger between the ram airflow and the ACM airflow.

At block 704, the method 700 includes calculating a kinetic energy of the ACM compressor. Calculating the kinetic energy of the ACM compressor is discussed in greater detail in connection with FIG. 9. At block 706, the method 700 includes calculating an ACM compressor efficiency. Example calculating of the ACM compressor efficiency is discussed in greater detail in connection with FIG. 10.

At block 708, the method 700 includes predicting a failure state of the ACM. While the method 700 generally predicts a failure in the ACM, in some examples, at block 708 the method can predict failure of a subcomponent of the ACM. For example, the failure prediction model may be able to identify a future failure in the ACM compressor bearings if ACM efficiency falls below 25%. Additionally, in some examples, the prediction model could identify a future failure in the ACM based on the efficiency rising above 125% (e.g., failure in the ACM compressor blades).

At block 710, the method 700 includes flagging the ACM compressor for maintenance. At block 712, the method 700 includes initiating a maintenance action to address the failure state of the ACM compressor. In some examples, flagging the ACM compressor for maintenance includes initiating a maintenance action.

FIG. 8 illustrates an example of how block 702 of the method 700 can be performed. In this example, the block 702 includes first sub-block 802 of calculating an energy transfer across a heat exchanger between a ram airflow and the ACM airflow. For example, the energy transfer can be calculated based on a measured first temperature of the ram airflow, a calculated second temperature of the ram airflow, a calculated mass flowrate of the ram airflow, and a mass flowrate of the ACM airflow.

The efficiency of a heat exchanger can be calculated based on a measured first temperature of the ram airflow, a measured first temperature of the heat exchanger airflow, and a measured second temperature of the heat exchanger airflow. A heat exchanger assembly 410 may be comprised of multiple sub-assemblies (e.g., primary heat exchanger 412 and secondary heat exchanger 414). Sensors required to measure a first temperature of the heat exchanger airflow and a second temperature of the heat exchanger airflow for all sub-assemblies may not already be disposed on airplane 100. In these cases, it is assumed that the efficiency of one sub-assembly already disposed with the required sensors is "substantially similar" to the efficiency of the other sub-assembly which is lacking the required sensors. For example, second heat exchanger 414 is disposed with first temperature sensor 452a and second temperature sensor 452b, so the second heat exchanger efficiency may be calculated. This assumption is valid for heat exchanger sub-assemblies disposed on airplane 100 which are made of the same material and for which the hot fluid and cold fluid are the same fluid (e.g., hot air exchanging heat with cold air) where the heat exchanger sub-assemblies have been installed on airplane 100 for the same length of time therefore having similar levels of performance degradation.

The temperature of the ram airflow (e.g., inlet air condition 512) could be measured by sensors and systems already disposed on the airplane 100 (e.g., the airplane 100 pitot static system can measure airspeed). The change in temperature of the ram airflow (e.g., outlet air condition 514) can be calculated empirically for all possible flow conditions based on energy transfer calculations of the ram airflow passing over the first heat exchanger 412 and the second heat exchanger 414. For example, the change in temperature of the ram airflow can be calculated based on the Equation 1 below. Additionally, the ram airflow mass flow rate can be calculated (such as in Equation 2a, Equation 2b, and Equation 2c below) while the ACM airflow mass flow rate can be measured by a flow sensor, such as the flow sensor 356. The change in temperature of the ACM airflow through the first heat exchanger can be empirically calculated for all possible flow conditions based on the heat exchanger assembly efficiency calculations in Equation 3a and Equation 3b and Equation 3c. The empirically calculated change in temperature of the ACM airflow calculated based on Equation 3c can be used in Equation 1 to empirically calculate the change in temperature of the ram airflow.

$$\Delta T_{ram} = \frac{-\dot{m}_{ACM} \times C_p \times \Delta T_{hx}}{\dot{m}_{ram} \times C_p} \quad \text{Equation 1}$$

$$\dot{m}_{ram} = \rho_{ram} \times A_{ram,open} \times \bar{V}_{ram} \quad \text{Equation 2a}$$

$$\dot{m}_{ram} = \left(\frac{P_{amb}}{R \times T_{amb}}\right) \times A_{ram,open} \times \bar{V}_{ram} \quad \text{Equation 2b}$$

$$A_{ram,open} = A_{ram,minopen} + (A_{ram,percent} \times A_{ram,maxopen}) \quad \text{Equation 2c}$$

In Equation 1, the change of temperature of the ram airflow is equal to the product of the mass flow rate of airflow in the ACM system, the thermal coefficient, and the change of temperature across the heat exchangers (e.g., first and second heat exchangers 412, 414)) divided by the product of the mass flow rate of the ram airflow and the thermal coefficient. The mass flow rate of the ram airflow is equal to the product of the density of the ram airflow, the open area of the ram air inlet, and the velocity of the ram air inlet. The density of ram airflow from Equation 2a can be calculated by the mathematical expression in the first parenthetical of Equation 2b. The density of ram airflow can be calculated by the ideal gas law where the ambient pressure is divided by the product of the gas constant and the ambient temperature. Furthermore, the open area of the ram airflow can be calculated by the mathematical expression of Equation 2c. In Equation 2c, the open area of the ram air inlet is the sum of the ram air inlet opening that always stays open ($A_{ram,minopen}$) (even when the inlet door is fully closed) and the open area of the openable portion of the ram air inlet 212. The openable portion of the ram air inlet 212 is the portion of the ram air inlet 212 covered by the inlet door 214 between the fully open position (100 percent (%) open) and the fully closed position (0% open). As a result, the area of the openable portion can be calculated as the product of the area of the openable portion ($A_{ram,maxopen}$) and the open percentage of the inlet door 214 ($A_{ram,percent}$). In some examples, the velocity of the ram air inlet can be calculated based on converting an airplane Mach number (as a fraction of the speed of sound) into velocity (e.g., meters per second, miles per hour, etc.).

$$\varepsilon_{hx} = \frac{T_{hot,inlet} - T_{hot,outlet}}{T_{hot,inlet} - T_{cold,inlet}} \quad \text{Equation 3a}$$

$$\varepsilon_{hx} = \frac{T_{ACM,outlet} - T_{sechx,outlet}}{T_{ACM,outlet} - T_{ram,inlet}} \quad \text{Equation 3b}$$

$$\varepsilon_{hx} = \frac{-\Delta T_{hx}}{T_{PACK,inlet} - T_{ram,inlet}} \quad \text{Equation 3c}$$

In Equation 3a, the heat exchanger efficiency is equal to the difference between the hot air inlet temperature and the hot air outlet temperature divided by the difference between the hot air inlet temperature and the cold air inlet temperature. In Equation 3b, the generalized heat exchanger efficiency calculation is applied to the second heat exchanger 414 and heat exchanger efficiency is equal to the difference between the second heat exchanger hot air inlet temperature measured by sensor 452a and the second heat exchanger hot air outlet temperature measured by sensor 452b divided by the difference between second heat exchanger hot air inlet temperature and the second heat exchanger cold air inlet temperature measured by the pitot static system of airplane 100. In Equation 3c, it is assumed that the efficiency of the first heat exchanger is "substantially similar" to the second heat exchanger and is equal to the change in temperature of the ACM airflow through the first heat exchanger divided by the difference between the first heat exchanger hot air inlet temperature measured by sensors 352a and 352b and the first heat exchanger cold air inlet temperature measured by the pitot static system of airplane 100.

At sub-block 804, the method includes calculating an inlet energy of the ACM airflow at the inlet of the ACM compressor. The inlet energy can be calculated based on mass flow rate of the ACM airflow and an inlet temperature of the ACM airflow at the inlet of the ACM compressor calculated based on the energy transfer calculation between the ACM airflow and the ram airflow. For example, based on the mass flow rate and known properties of air, the velocity of the air can be calculated. With the velocity of the air and the temperature of the air being known, the total energy of the air can also be calculated, using commonly known principles of fluid mechanics.

At sub-block 806, calculating an outlet energy of the ACM airflow. Calculating or receiving the mass flow rate of the ACM airflow and an outlet temperature of the ACM airflow, the outlet temperature measured by a temperature sensor disposed at the outlet of the ACM compressor. As discussed above, the total energy of the airflow at the outlet of the ACM can be calculated based on the mass flow rate of the air, the temperature, and other commonly known properties of air.

In some examples, the mass flow rate of the ACM airflow and/or the temperature of the ACM airflow at the outlet of the ACM compressor can be measured by sensors (e.g., flow sensor 356 and temperature 452c, respectively). However, in some examples, the mass flow rate of the ACM airflow can be calculated based on commonly understood principles of fluid mechanics.

At sub-block 808, subtracting the inlet energy of the ACM airflow from the outlet energy of the ACM airflow. As a result, at sub-block 808 the energy difference between the inlet and the outlet of the ACM compressor is calculated, as shown in Equations 4a, 4b, and 4c.

$$E_{airflow} = C_v \times T + \frac{V^2}{2g_c} \quad \text{Equation 4a}$$

$$\Delta E_{ACM} = E_{ACM,outlet} - E_{ACM,inlet} \quad \text{Equation 4b}$$

$$\Delta E_{ACM} = \left(C_v \times T + \frac{V^2}{2g_c}\right)_{outlet} - \left(C_v \times T + \frac{V^2}{2g_c}\right)_{inlet} \quad \text{Equation 4c}$$

FIG. 9 illustrates an example of how block 704 of the method 700 can be performed. In this example, the block 704 includes first sub-block 902 of calculating a compressor pressure ratio of the ACM compressor. In the present example, the compressor pressure ratio can be calculated by the change in temperature at the inlet and outlet of the ACM compressor, but can be calculated using pressure. One example of calculating the compressor pressure ration (CPR) is shown in Equation 5

$$CPR = \left(\frac{T_{ACM,outlet}}{T_{ACM,inlet}}\right)^{\gamma/\gamma-1} \quad \text{Equation 5}$$

At sub-block 904, the block 704 may include receiving fluid density data or information of the ACM airflow at the inlet of the ACM compressor. For example, for a known temperature and pressure, air has a known density that can be retrieved from a database. In other examples, the density of air can be calculated based on principles of the ideal gas law and equation.

At sub-block 906, the block 704 may include calculating the work of the ACM compressor on the ACM airflow as the ACM airflow passes through the ACM compressor as set forth in Equation 6 below. At sub-block 908, the kinetic energy of the ACM compressor is calculated as equal to the work of the ACM compressor on the ACM airflow.

$$KE_{ACM} = W_{ACM} = \frac{1}{2} \times I_{ACM} \times \omega_{ACM}^2 \quad \text{Equation 6}$$

FIG. 10 illustrates an example of how block 706 of the method 700 can be performed. In this example, the block 706 includes first sub-block 1002 of receiving information or data regarding a change in energy of the ACM airflow. In some examples, the change in energy information was calculated at sub-block 808 of FIG. 8.

At sub-block 1004, the block 706 may include receiving a kinetic energy of the ACM compressor. The kinetic energy of the ACM compressor is equal to the work the ACM compressor does on the airflow passing through the ACM compressor. The work of the ACM compressor and the kinetic energy of the ACM compressor can be calculated as shown in Equations 6. The moment of inertia ($I_{ACM}$) of Equation 6 can be determined based on experimental testing or other empirical data.

In Equation 6, the kinetic energy of the ACM compressor is equal to the work of the ACM compressor. And each can be calculated as one-half of the product of the rotational moment of inertia and the rotational velocity of the ACM compressor, squared. The rotational speed of the ACM compressor can be obtained via sensors (e.g., ACM speed sensor 454). Additionally, the rotational moment of inertia of the ACM compressor can be determined empirically using the same equation.

At sub-block 1006, the block 706 may include calculating an efficiency of the ACM compressor (Equation 7) by calculating a ratio of the change in energy of the ACM airflow to the kinetic energy of the ACM compressor. In the present example, the change in energy of the ACM airflow having been calculated at sub-block 808 and the kinetic energy of the ACM compressor having been calculated at sub-block 902.

$$\varepsilon = \frac{\Delta E_{ACM}}{KE_{ACM}} \quad \text{Equation 7}$$

At sub-block 1008, the block 706 may include calculating an efficiency of the ACM compressor (Equation 8) by calculating a ratio of the change in energy of the ACM airflow to the theoretical work of the ACM compressor. In the present example, the change in energy of the ACM airflow having been calculated at sub-block 808 and the theoretical work of the ACM compressor having been calculated at sub-block 902.

$$\varepsilon_W = \frac{\Delta E_{ACM}}{W_{ACM}} \quad \text{Equation 8}$$

The efficiency calculated in Equation 7 and Equation 8 can be calculated for each instant of a flight. As a result, it is possible to detect a spike and/or a trend in efficiency. For example, a sharp spike above 100% indicates that compressor blades in the ACM compressor may be rubbing against the compressor housing and artificially warming the airflow in the PACK system 400. Alternatively, a gradually decreasing efficiency is indicative of possible failure in the bearings disposed in the ACM compressor. In such an example, the bearings do not allow the ACM compressor to rotate smoothly and the efficiency of the ACM compressor drops. Additionally, a sharp spike in or gradually decreasing efficiency calculated in Equation 7 indicates a failure which is having a significant impact on the ACM compressor outlet temperature such as air leakage local to ACM compressor or degradation of ACM compressor blades. In such an example, significant thermal energy losses occur due to air leakage or degraded ACM compressor blades resulting in lower-than-expected ACM compressor outlet temperatures. In either failure case, the ACM assembly needs to be flagged for maintenance.

Based on the foregoing, the method can predict failure in the ACM compressor 422 dozens of days or cycles (i.e., flights) before the ACM compressor actually fails. In some examples, the method can predict failure in an ACM compressor more than 30 cycles before the ACM compressor 422 would actually fail. In such examples, the ACM compressor 422 can be flagged for a maintenance action. As a result, ground crews can plan for inspecting and repairing the ACM compressor instead of overhauling the PACK system 400 after the ACM compressor 422 fails. In one example, the ACM may be tested under the breakaway torque check. The breakaway torque check tests the minimum torque necessary to begin rotation of the ACM. Alternatively, the ACM blades can be inspected by visual inspection, either directly or via boroscope. Lastly, the ACM ducting can be checked for leaking by running the PACK system and checking the ducting for leaks with, for example, an ultrasonic imager tool or other typical leak check methods.

FIG. 11 is a block diagram of an exemplary system 1100 for operating an ACM health monitoring system 1102 on, for example, airplane 100. In various examples, the ACM health monitoring system 1102 may be part of the computing device 366. In the example of FIG. 11, the ACM health monitoring system 1102 is disposed on the airplane 100, however in some examples, the ACM health monitoring system 1102 could be fully disposed on a server disposed remote from the airplane 100. In various examples, the ACM health monitoring system 1102 could interact with aircraft sensors 1104 and a network 1106. In other examples, the ACM health monitoring system 1102 could interact with more aircraft systems.

Network 1106 may be a single wireless network, or may include multiple cooperating and/or independent networks of one or more types (e.g., a cellular telephone network, a wireless local area network (WLAN), the Internet, satellite communication, etc.). The ACM health monitoring system 1102 may be in communication with a maintenance server 1122 via network 1106. Additionally and/or alternatively, the network 1106 can communicatively connect the ACM health monitoring system with a remote computer system 1124 via transceiver 1126. While FIG. 11 shows only a single airplane 100, it is understood that maintenance server 1122 may communicate (e.g., via network 1106) with a fleet of aircraft (e.g., one or more other aircraft similar to airplane 100) and/or other entities (e.g., third party servers that are not affiliated with the entity owning, maintaining, and/or using the airplane 100 and/or the maintenance server 1122). As used herein, the term "server" may refer to a single server, or multiple servers communicating with each other.

The ACM health monitoring system 1102 includes a controller 1142, a local interface 1134, and a network interface 1136. In various examples, the local interface 1134 and the network interface 1136 may be wired interfaces (e.g., Ethernet cables, USB cables, etc.) or wireless interfaces (e.g., WiFi, Bluetooth, etc.). In various examples, the local interface 1134 may communicatively couple the ACM health monitoring system 1102 with aircraft sensors 1104 and/or other airplane 100 systems. The aircraft sensors 1104 may include the CAC sensors and the ACM sensors. Additionally, the network interface 1136 connects the airplane 100 with the network 1106 and, by extension the maintenance server 1122 and/or other remote computer systems 1124. Additionally, the ACM health monitoring system 1102 may include a user interface 1138 that may include a local display. For example, the user interface 1138 could be a part of the airplane 100 cockpit and could include screens and various buttons to control the ACM health monitoring system 1102. As a result, a pilot or other airplane 100 crew member can locally control and interact with the ACM health monitoring system 1102 via the user interface 1138.

The ACM health monitoring system 1102 includes a controller 1142 having a processor 1144 and a memory 1146. In various examples, the processor 1144 and/or the memory 1146 may be typical computer processors and/or memory, but in other examples the processor 1144 and/or memory 1146 may be custom built for use on airplane 100. The memory includes various programs adapted to operate the ACM health monitoring system 1102.

The memory 1146 may include an ACM sensor poling system 1152, an ACM compressor efficiency ratio calculator 1154, and an ACM failure modeler 1156. The ACM sensor poling system 1152 is configured to request and/or receive sensor data from the aircraft sensors 1104. The ACM sensor poling system 1152 may then store sensor data in a separate, sensor database 1158. The ACM compressor efficiency ratio calculator 1154 performs the necessary calculations to determine the ACM compressor efficiency ratio, for example implementing the processes and methods described and illustrated herein. In various examples, the ACM compressor efficiency ratio calculator 1154 may be configured to perform the method 700. Lastly, the ACM failure modeler 1156 receives ACM compressor efficiency ratio calculations from the ACM compressor efficiency ratio calculator 1154. The ACM failure modeler 1156 is configured to model and predict failure in various ACM compressor components based on the ACM compressor efficiencies, for example implementing the processes and methods described and illustrated herein.

In various examples, the processor 1144 accesses memory 1146 to run the ACM compressor efficiency ratio calculator 1154 and/or the ACM failure modeler 1156. As a result, the processor 1144 can access the ACM compressor efficiency ratio calculator 1154 to calculate energy of the air in the ACM airflow system at the inlet and the outlet of the ACM compressor, a rotational kinetic energy of the ACM compressor, and/or an efficiency of the ACM compressor. Additionally or alternatively, the processor can access the ACM failure modeler 1156 to predict a failure state of the ACM compressor by comparing the efficiency of the air cycle compressor to a failure prediction model.

Additionally, the system 1100 includes the maintenance server 1122 which may be disposed at an airplane 100 hanger or central facility. The maintenance server 1122 may include a processor 1162 and a memory 1164. In various examples, the ACM sensor poling 1152, ACM compressor efficiency ratio calculator 1154, and ACM failure modeler 1156 are fully disposed on the maintenance server 1122. As a result, the ACM health monitoring system 1102 may still maintain a sensor database 1158 and provide sensor data to the maintenance server 1122 when the network interface 1136 is connected to the network 1106.

Figure 12:
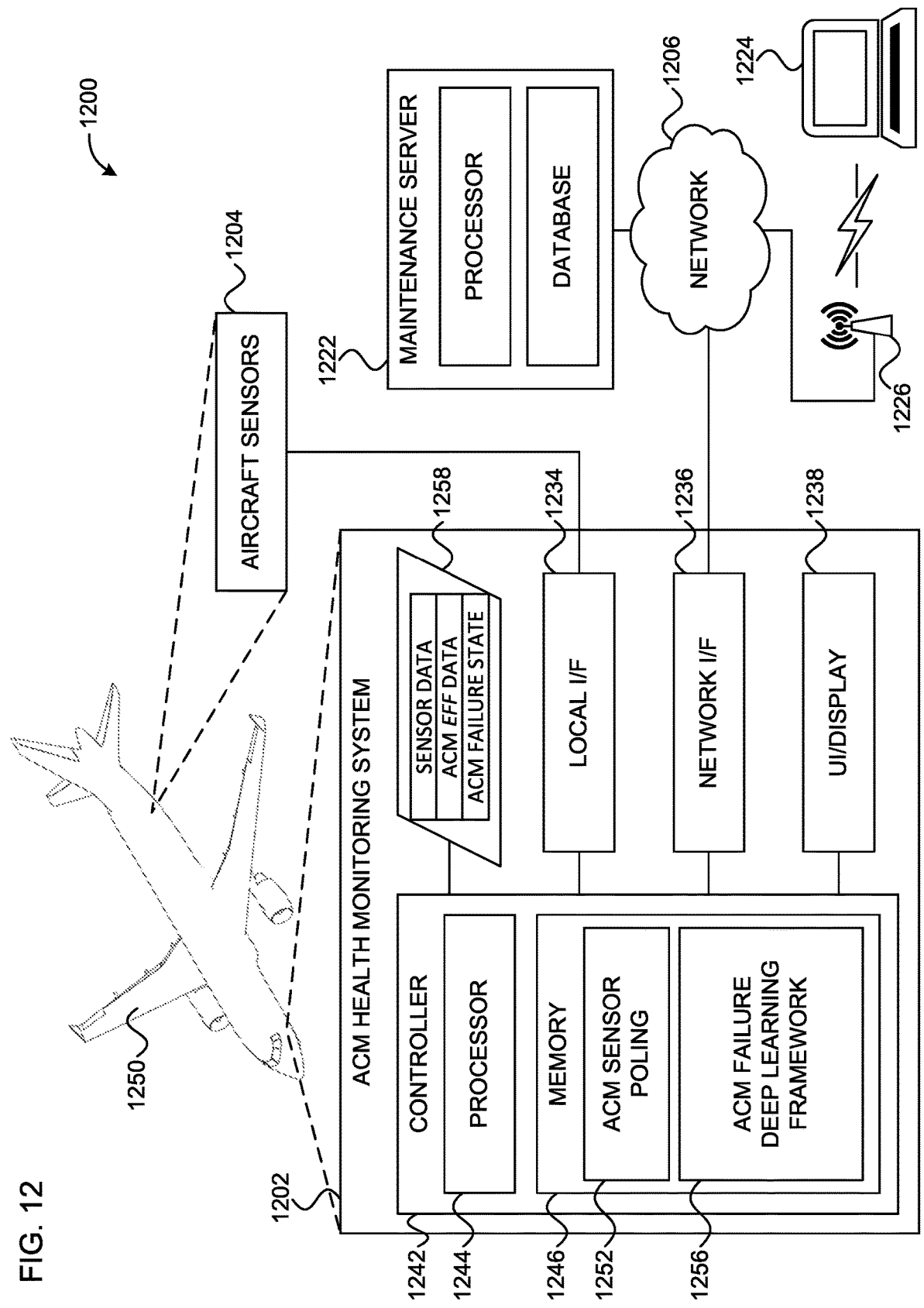
FIG. 12 is a block diagram of another exemplary system for operating an ACM health monitoring system and having a trained deep learning framework, in accordance with an example.

While in the exemplary system 1100, the airplane 100 includes the ACM health monitoring system 1102 that utilizes an ACM compressor efficiency ratio calculate 1154 and an ACM failure modeler 1156, in other examples, ACM health monitoring may be achieved in a trained deep learning framework. FIG. 12, for example, illustrates a system 1200 that may be implemented on an airplane 1250 and that includes an ACM health monitoring system 1202 having elements similar to that of the ACM health monitoring system 1102, but that relies upon a trained ACM failure deep learning framework 1256 within a memory 1146.

The ACM health monitoring system 1202 includes a controller 1242 having a processor 1244 and the memory 1246, similar to the controller 1142 of FIG. 11. Also, the memory 1246 includes an ACM sensor poling system 1252 similar to the ACM sensor poling system 1152. Similar to the system 1102, the ACM health monitoring system 1202 may be disposed on the airplane 1250. Although in some examples, all or part of the ACM health monitoring system 1202 may be implemented on a server remote from the airplane 125. In the illustrated examples, the ACM health monitoring system 1202 interact with aircraft sensors 1204, such as CAC sensors and ACM sensors described herein. A network 1206 may be provided to allow the ACM health monitoring system 1202 to interact with more aircraft systems. The network 1206, like the network 1106, may be a single wireless network, or may include multiple cooperating and/or independent networks of one or more types (e.g., a cellular telephone network, a wireless local area network (WLAN), the Internet, satellite communication, etc.). In the illustrated example, a maintenance server 1222 is shown coupled to the system 1202 via the network 1206, which may also communicatively coupled the to a remote computer system 1224 via transceiver 1226.

Returning to the memory 1246, the ACM failure deep learning framework 1256 may be trained to predict a failure state of at least one of the ACM compressor and the ACM turbine blades. The ACM failure deep learning framework 1256 may be implemented as one or more trained machine learning models or neural networks. The framework 1256 may be implemented as gradient boosting models, random forest models, neural networks (NN), regression models, Naive Bayes models, or other machine learning algorithms (MLA). These machine learning algorithms may be supervised algorithms or non-supervised. In an example, the framework 1256 was implemented using an Extreme Gradient Boosting (XGB) model, available from XGBoost, which is an open-source software library that implements optimized distributed gradient boosting machine learning algorithm under the Gradient Boosting framework, as well as, other algorithms such as logistic regression. The framework 1256 may be implemented in any number of other configurations that provide advanced modeling techniques. Other configurations for the framework 1256 include a deep graph convolution model designed to isolate ACM system faults, attention-based convolutional neural networks (CNN), and anomaly detection networks for example those employing topological data analysis.

With attention-based CNNs, as well as with other configurations, the framework 1256 may be trained to receive streams of data and filter out background noise and/or other signal anomalies to allow for prediction analysis of relevant time windows of data in the received stream of data (including from different sensors). Such features are particularly useful in detecting ACM failure, as described in various examples herein. In some instances, a human may be able to label received image or video data. But such a process would be laborious and fraught with errors. Plus, identifying the particular windows of time during which useful data (as opposed to anomalous data) is present can be near impossible for a human, especially in situations where noise is high or when the time window is long. In training an attention-based CNN, labeled data may be used to train the framework, where labeling rules may be applied that do not require strict labeling of feature data. Instead, attention-based CNNs can focus on labeled activity among long sequences of sensor data, filtering out a large amounts of background noise signal to allow for more accurate classification from the CNN. Further, requirement of labeling the exact locations of feature data in the training data set may be avoided if the CNN is able to score or otherwise analyze more general locations of feature data. This can be particularly useful in examples where the training data set includes different types of feature data captured (and labeled) over different windows of time, such as the feature data 1400 shown in FIG. 14. The process of data collection and annotation for training purposes is able to produce a highly accurate ACM failure prediction framework.

With anomaly detection networks, the framework 1256 may be configured with machine learning algorithms that provide topological based data analysis that are able to extract feature data from datasets that are high-dimensional, incomplete, and/or noisy. In such examples, training of the framework 1256 may be achieved from a received streams of labeled training data (including data from different sensors that has been labeled), and the framework 1256 may perform dimensionality reduction on the data to identify the most relevant feature data. Topology based data analysis can be used to effect such dimensionality reduction.

Figure 13:
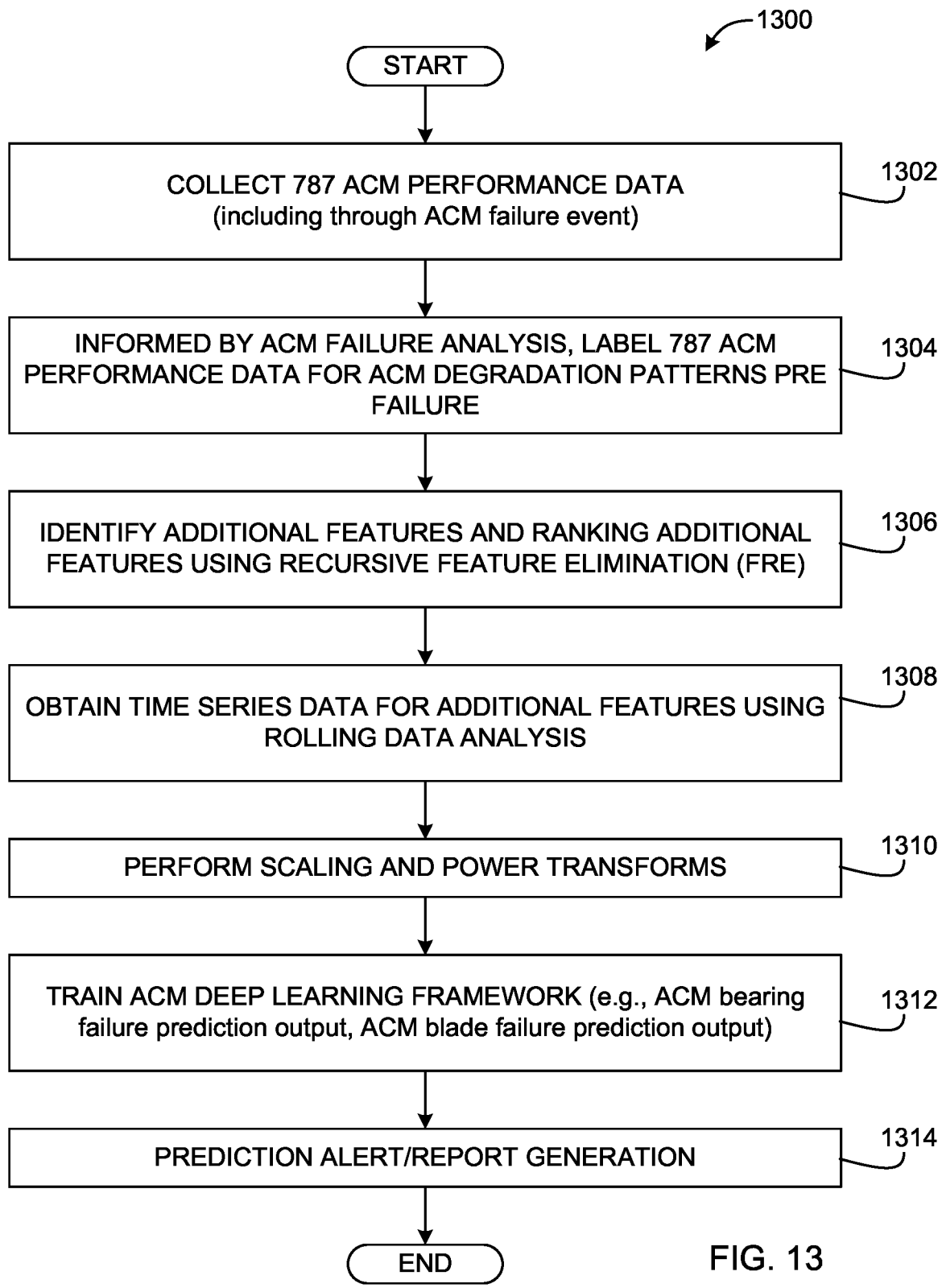
FIG. 13 is a flowchart illustrating an example method for training the deep learning framework of FIG. 12, in accordance with an example.

FIG. 13 illustrates a method 1300 for training an ACM failure deep learning framework, such as framework 1256, to predict a failure state of at least one of the ACM compressor and the ACM turbine blades. At ab lock 1302, ACM performance data is collected, including performance data before and through an ACM failure event. In an example, we collected over 30,000 CABIN AIR CONDITIONING (CACTCS) reports from an over 60 Boeing 787 aircraft, with approximately, 25 aircraft having a historical ACM failure event. At a block 1304, supervised annotation of the collected data from block 1302 is performed. For example, at the block 1304 maintenance professionals labeled the ACM performance data for degradation patterns that exist before the ACM failure event. Further such degradation patterns labeled in training data may depend on the ACM failure type. For example, in developing training data for performance degradation related to journal bearing, thrust bearing, and compressor thrust bearing, degradation patterns may be identified with respect to the two failure types, efficiency impossibly high and efficiency very low. The labeling at the block 1304 may be performed in various ways and may include a recursive process of labeling, testing, and then revised labeling, to determine which ACM degradation patterns to label in the training data set. In some examples, if the identified patterns were present in ACM performance data that did show degradation, such performance data would still be labeled course for using the training data, so as to not result in overfitting of the training data.

Figure 14:
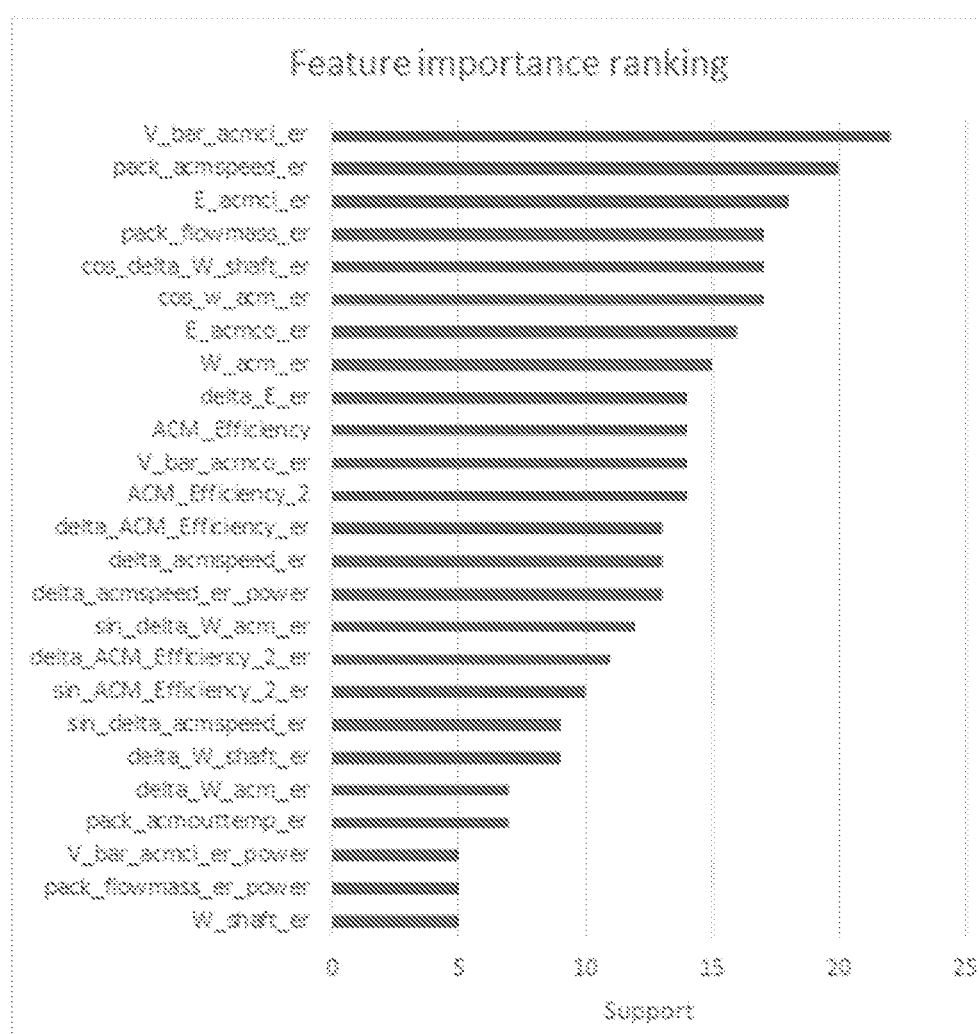
FIG. 14 is a listing of ranked features that may be included in a training data set used to train the deep learning framework of FIG. 12, in accordance with an example.

In addition to labeling the ACM performance data for ACM degradation patterns prior to failure, the method 1300, includes identifying additional features in the ACM performance data that may be identified (at block 1306). Such additional features may also be used for labeling the training data set. The block 1306 may further including applying a ranking of the additional features using recursive feature elimination (FRE). Thus, the block 1306, applying a ranking of additional features, is able to perform feature selection that removes the weakest or weaker features until a smaller number (more highly correlative) features remain. FIG. 14 illustrates a listing of additional features 1400 in the ACM performance data that may be ranked and then assessed (e.g., using FRE or other feature reduction techniques) and included. By way of example, the features 1400 include several categories of features: physical characteristics of aircraft components, calculated ACM operation data, and calculated ACM efficiency values. The physical characteristics include, for example, ACM speed (e.g., "acmspeed"); change in ACM speed over time (e.g., "delta_acmspeed"); and average velocity (e.g., "V_bar") of the compressor. The calculated ACM operation data include work (e.g., "W") of the ACM and the ACM shaft; energy (e.g., "E" or "KE") of the ACM; rolling data of work and energy; PACK airflow mass flow rate (e.g., "pack_flowmass"); and airflow temperature (e.g., "PACK_acmouttemp"). The ACM Efficiency values include ACM efficiency, change in ACM efficiency over time, and ACM efficiency rolling over time. In some examples, the collected data may be from or corresponding to rotational components, where some or all of such data may be captured and processed using mathematical functions of sine (i.e., "sin") and/or cosine (i.e., "cos") of the measured value, instead of using the actual measured data itself.

At a block 1308, the method 1300 obtains from the ACM performance data time series data so that the training data includes not only the labeled patterns and underlying discretized, but also time-series data. That time-series data may include, for example, calculated rolling average and/or rolling standard deviation data for the ACM performance data. Such rolling data may be obtained for different cycles, such as for 30 cycle windows, 60 cycle windows, and 90 cycle windows. By obtaining rolling data and obtaining rolling data over different window cycles in the trained data, the resulting ACM failure deep learning framework may be configured to more accurately predict failure early in the ACM degradation process. In the illustrated example, optional scaling and power transforms are performed on the data from blocks 1308, 1306, and 1304.

At a block 1312, the data from block 1310 is fed to an ACM failure deep learning framework for training to predict ACM bearing failure and ACM blade failure, thereby generating a trained ACM failure deep learning framework configured to generate prediction alerts and prediction reports (at a block 1314) in response to subsequently collected ACM performance data fed thereto. Prediction values from the trained model of 1312 include: ACM failure probability high or low or other (e.g., unequivocal); and ACM efficiency high, low, excessively high, excessively low, or other (e.g., unequivocal). Thus, in some examples, the trained ACM failure deep learning framework generates an ACM failure prediction value. In some examples, the framework may additionally output an ACM efficiency value and/or an ACM efficiency classification (high, low, excessively high, excessively low). Further, in some examples, the framework may generate an ACM failure prediction type, such as ACM compressor bearings value or ACM compressor blades failure. For the latter, the ACM failure deep learning framework may include an ACM failure prediction filter at an output stage, where that filter processes the prediction output to identify the type of ACM failure. In an example, the output stage may apply an ACM failure prediction filter that applies two or more failure patterns, each to identify one of either an ACM compressor bearings failure or an ACM compressor blades failure.

Figure 15:
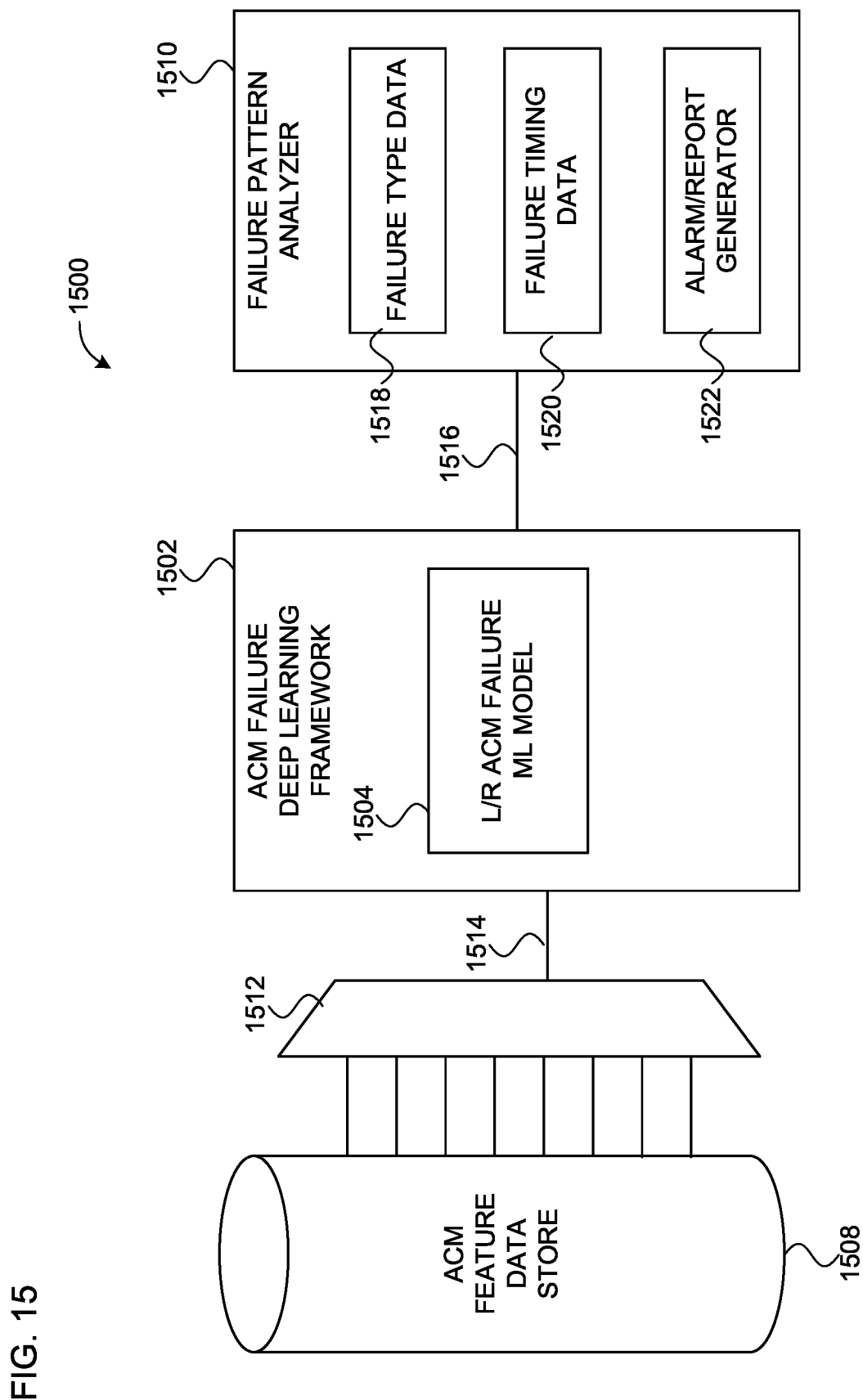
FIG. 15 is a block diagram of an example machine learning architecture used in accordance an example.

FIG. 15 illustrates an example machine learning architecture 1500, in accordance with the examples herein. The machine learning architecture 1500, for example, may be used to implement the method 1300 during training of the machine learning architecture 1500. In some examples, the machine learning architecture 1500 represents an already trained architecture. In examples described herein, the machine learning architecture 1500 is used for failure prediction in an ACM. The architecture 1500 includes an ACM failure deep learning framework 1502, which may be an example implementation of the ACM failure deep learning framework 1256. Generally, the ACM failure deep learning framework 1502 may be configured to predict the failure of ACMs (such as that of the B787 Boeing aircraft and other aircraft) within a prediction window, e.g., within the next 30 days, to minimize downtime and maintenance costs. In an example, the ACM failure deep learning framework 1502 may include one or more trained machine learning models that utilize an XGBoost algorithm and a feature selection pipeline that searches for the optimal number of features while simultaneously tuning for the best parameter configuration of gradient boosting models. The final chosen features may be the features 1400 or other features, selected using a Recursive Feature Elimination (RFE) as the feature selection strategy, and ranked by model-estimated importance on average over 100 trials, as support. In an example implementation, to evaluate the performance of the trained model or models of the ACM failure deep learning framework 1502, we trained the model on all failure cases, reserved one aircraft as a test set, and looped through all failure cases to obtain an average performance over different ACM failure cases. We used metrics such as the Matthews correlation coefficient (MCC), precision, recall, and F1-score to evaluate the model's performance, achieving an average precision of 80.4%, a recall of 66.2%, an F1-score of 72.6%, and an MCC of 0.7288.

In an example, the final model was trained on all failure cases to predict ACM failure events by providing appropriate input features calculated from ACMS reports in real time. In this way, the ACM failure deep learning framework 1502 was designed to predict failure events 30 days in advance. However, of course, the performance of the ACM failure deep learning framework 1502 may vary depending on the specific data provided to the trained model(s) and/or based on the training data.

In the illustrated example, the deep learning framework 1502 includes a trained (and/or to be trained) machine learning model. Specifically, the deep learning framework 1502 includes a Left/Right ACM failure machine learning model 1504, trained to implement any of the various ACM failure analysis techniques herein. In other examples, the deep learning framework 1502 may include additional or alternative machine learning models. A feature store 1508 stores ACM feature data, which may be labelled or pre-labeled training data, used for training the ML model 1504. The feature store 1508 may store feature data captured from aircraft sensors, etc. during operation of the aircraft for predicting ACM failure with the model 1504 trained. The ACM feature data, for example, may include the features 1400 or a subset thereof, such as the highest number of ranked features. Thus, the data store 1508 may store collected feature data of the ACM and other aircraft operations, as described herein, such as, flow sensor data, temperature sensor data, pressure sensor data, speed sensor data, and computer data herein. The data store 1508 may include training data, real-time captured data from an aircraft, historical real-time captured data from that aircraft, captured data from other aircraft, combinations thereof, etc. For example, the data store 1508 may include physical characteristics data of aircraft components of the ACM, calculated ACM operation data, and/or calculated ACM efficiency data. The ACM feature data from the data store 1508 is fed to a feature data extraction processor 1512 that may be configured to perform data processing operations such as power scaling, transforms, padding, noise reduction, etc., as well as feature reduction operations such as dimensionality reduction or recursive feature elimination. The resulting feature data 1514 is provided to the deep learning framework 1502.

During training, the feature data 1514 is provided to the deep learning framework 1502 for training the ML model 1504. During prediction operation, the feature data 1514 is provided to the deep learning framework 1502 for determining, through the ML models 1504, a prediction of ACM cycling failure. Thus, during prediction operation, the collected feature data 1514 may be performance data of the aircraft, such as the features 1400 or a subset thereof, or any of the measured data described herein for ACM failure prediction. In some examples a prediction score is provided for each failure type, e.g., for ACM failure prediction in the illustrated example. Thus, in some examples, a single prediction score is provided, even where the deep learning framework 1502 contains multiple trained machine learning models. For example, the ML model 1504 may have a Softmax layer that generates a single prediction score. In any case, a prediction output 1516 is generated by the deep learning framework 1502 and provided to a failure pattern analyzer 1510. The analyzer 1510 applies a heuristic to the prediction data 1516 to determine a predicted failure type, stored in data 1518, and a predicted failure time, stored in data 1520. The heuristic may be a threshold value (e.g., a prediction score above or a below a predetermined amount may indicate failure type and/or a time to failure). The heuristic may be a pattern of prediction scores over time, such as a rate of change in prediction scores over a window of time or a rate of acceleration (change in the rate of change) of predictions scores over a window of time. That is, in some examples, prediction scores are determined and stored over different data collection events, e.g., for a series of flights over time, and compared against one another in the analyzer 1510 to determine such trends that are indicative of the predicted type of failure and/or the predicted time to failure. Heuristics may be further used to determine if an alarm and/or report should be generated (at alarm/report generator 1522) to indicate to personnel of the predictions stored at 1518/1520 and/or the prediction score 1516.

Thus, in this way, the architecture 1500 may be used to implement of a process for failure prediction in an ACM that collects ACM feature data that may include physical characteristics data of aircraft components of the ACM, calculated ACM operation data, and/or calculated ACM efficiency data. In some examples, that process may then provide the collected ACM feature data to the ACM failure machine learning model 1504 trained using time series ACM feature training data. The ACM failure machine learning model 1504 is then able to generate an ACM failure prediction score (1516) and provide that ACM failure prediction score to the failure pattern analyzer 1510, where a heuristic may be applied to the ACM failure prediction score to determine an ACM failure prediction. A failure prediction report containing the ACM failure prediction can then be generated, stored, and/or displayed by the report generator 1522 for reporting the failure prediction of the ACM. That ACM failure prediction may include identification of a predicted ACM failure (such as a failure of ACM bearings or ACM blades) and a predicted ACM failure timing (e.g., predicted time to failure, predicted cycles before failure).

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Additionally, certain embodiments are described herein as including logic or a number of routines, subroutines, applications, or instructions. These may constitute either software (e.g., code embodied on a machine-readable medium or in a transmission signal) or hardware. In hardware, the routines, etc., are tangible units capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple of such hardware modules exist contemporaneously, communications may be achieved through signal transmission (e.g., over appropriate circuits and buses) that connects the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of the example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods or routines described herein may be at least partially processor-implemented. For example, at least some of the operations of a method may be performed by one or more processors or processor-implemented hardware modules. The performance of certain of the operations may be distributed among the one or more processors, not only residing within a single machine, but also deployed across a number of machines. In some example embodiments, the processor or processors may be located in a single location (e.g., within a home environment, an office environment or as a server farm), while in other embodiments the processors may be distributed across a number of locations.

The performance of certain of the operations may be distributed among the one or more processors, not only residing within a single machine, but also deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. For example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the description. This description, and the claims that follow, should be read to include one or at least one and the singular also includes the plural unless it is obvious that it is meant otherwise.

This detailed description is to be construed as an example only and does not describe every possible embodiment, as describing every possible embodiment would be impractical, if not impossible. One could implement numerous alternate embodiments, using either current technology or technology developed after the filing date of this application.

Those skilled in the art will recognize that a wide variety of modifications, alterations, and combinations can be made with respect to the above described embodiments without departing from the spirit and scope of the invention(s) disclosed herein, and that such modifications, alterations, and combinations are to be viewed as being within the ambit of the inventive concept(s).

What is claimed is:

1. A method for failure prediction in an Air Cycle Machine (ACM), the method comprising:
    calculating a change in energy of an ACM airflow passing from an inlet of an ACM compressor to an outlet of the ACM compressor by:
        calculating an energy transfer across a heat exchanger between a ram airflow and the ACM airflow from a measured first temperature of the ram airflow, a calculated second temperature of the ram airflow, a calculated mass flowrate of the ram airflow, and a mass flowrate of the ACM airflow;
        calculating an inlet energy of the ACM airflow at the inlet of the ACM compressor from the mass flow rate of the ACM airflow and an inlet temperature of the ACM airflow at the inlet of the ACM compressor calculated based on the energy transfer calculation between the ACM airflow and the ram airflow;
        calculating an outlet energy of the ACM airflow based on the mass flow rate of the ACM airflow and an outlet temperature of the ACM airflow, the outlet temperature measured by a temperature sensor disposed at the outlet of the ACM compressor; and
        subtracting the inlet energy of the ACM airflow from the outlet energy of the ACM airflow;
    calculating a kinetic energy of the ACM compressor based on calculating a work of the ACM compressor on the ACM airflow as the ACM airflow passes through the ACM compressor, calculating the work of the ACM compressor based on the inlet temperature of the ACM airflow at the inlet of the ACM compressor, compressor pressure ratio of the ACM compressor, and a fluid property of the ACM airflow at the inlet of the ACM compressor;
    calculating an ACM compressor efficiency as a ratio of the change in energy of the ACM airflow across the ACM compressor to the kinetic energy of the ACM compressor;
    predicting a failure state of the ACM based on a comparison of the ACM compressor efficiency to a failure prediction model; and
    flagging the ACM for maintenance,
        wherein flagging the ACM for maintenance includes initiating a maintenance action.

2. The method of claim 1, wherein initiating a maintenance action includes performing a breakaway torque check of the ACM.

3. The method of claim 1, wherein the energy transfer across the heat exchanger between the ram airflow and the ACM airflow includes disposing ducting of the ACM airflow in the ram airflow.

4. A method of predicting a failure state of an Air Cycle Machine (ACM) via sensor measurements outside an ACM system, comprising:

calculating an inlet temperature of an ACM airflow at an inlet of an ACM compressor based on calculating an energy transfer between the ACM airflow and a ram airflow, calculating the energy transfer including calculating a ram airflow mass flow rate, sensing an inlet ram airflow temperature, and sensing an outlet ram airflow temperature;

calculating a kinetic energy of the ACM compressor based on the inlet temperature of the ACM airflow at the ACM compressor inlet, a compressor pressure ratio of the ACM compressor, and a fluid density of the ACM airflow at the ACM compressor inlet;

calculating a change of energy of the ACM airflow from the inlet of the ACM compressor to an outlet of the ACM compressor based on the inlet temperature of the ACM airflow and sensing an outlet temperature of the ACM airflow at the ACM compressor outlet;

calculating a compressor efficiency as a ratio of the change of energy of the ACM airflow and the kinetic energy of the compressor;

predicting a failure state of the ACM based on comparing the compressor efficiency to a failure prediction model; and controlling the ACM in response to the prediction of the failure state by initiating a maintenance action.

5. The method of claim 4, wherein initiating a maintenance action includes performing a breakaway torque check of the ACM.

6. The method of claim 4, wherein calculating the energy transfer includes calculating energy transfer across a heat exchanger between the ram airflow and the ACM airflow.

7. An Air Cycle Machine (ACM) failure alert system, comprising:
an ACM ducting system disposed in an ACM system having air received from an air supply system of an aircraft;
an ACM compressor having an inlet and an outlet, the ACM compressor receiving an ACM airflow at the ACM compressor inlet;
a ram airflow system including air received from an exterior of the aircraft, the ram airflow system separate from the ACM ducting system;
a heat exchanger having a first side and a second side, the heat exchanger disposed between the ram airflow system and the ACM system, the ram airflow system disposed on one of the first side and the second side and the ACM system disposed on an other of the first side and the second side;
at least one sensor disposed in the ram airflow system; and
a processor configured to:
calculate energy of the air in the ACM system at the inlet and the outlet of the ACM compressor, a rotational kinetic energy of the ACM compressor, and an efficiency of the ACM compressor,
wherein calculating energy of the ACM airflow at the inlet of the ACM compressor is based on calculating energy transfer between the ram airflow and the ACM airflow across the heat exchanger, calculating the energy transfer based on a first ram airflow temperature, a second ram airflow temperature, a ram airflow mass flow rate, and an ACM airflow mass flow rate; and
predict a failure state of the ACM system by comparing the efficiency of the ACM compressor to a failure prediction model.

8. The system of claim 7, the processor further configured to initiate a maintenance action in response to predicting a failure state of the ACM system.

9. The system of claim 8, wherein the maintenance action includes a breakaway torque check of the ACM system.

10. The system of claim 7, wherein the at least one sensor is a temperature sensor.

* * * * *

UNITED STATES PATENT AND TRADEMARK OFFICE
CERTIFICATE OF CORRECTION

| | | |
|---|---|---|
| PATENT NO. | : 12,416,437 B2 | Page 1 of 1 |
| APPLICATION NO. | : 18/180678 | |
| DATED | : September 16, 2025 | |
| INVENTOR(S) | : Justin Sindewald et al. | |

It is certified that error appears in the above-identified patent and that said Letters Patent is hereby corrected as shown below:

In the Claims

Column 27, Line 21, Claim 4 "compressor;" should be -- ACM compressor; --.

Column 28, Line 21, Claim 7 "the" should be -- a --.

Column 28, Line 21, Claim 7 "the" should be -- an --.

Signed and Sealed this
Tenth Day of February, 2026

John A. Squires
*Director of the United States Patent and Trademark Office*